(12) United States Patent
Lee et al.

(10) Patent No.: US 10,833,829 B2
(45) Date of Patent: Nov. 10, 2020

(54) METHOD OF TRANSMITTING ACK/NACK MESSAGE IN WIRELESS COMMUNICATION SYSTEM AND TERMINAL USING SAME METHOD

(71) Applicant: LG Electronics Inc., Seoul (KR)

(72) Inventors: Seungmin Lee, Seoul (KR); Hanbyul Seo, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 16/098,774

(22) PCT Filed: May 2, 2017

(86) PCT No.: PCT/KR2017/004694
§ 371 (c)(1),
(2) Date: Nov. 2, 2018

(87) PCT Pub. No.: WO2017/192009
PCT Pub. Date: Nov. 9, 2017

(65) Prior Publication Data
US 2019/0132104 A1    May 2, 2019

Related U.S. Application Data

(60) Provisional application No. 62/350,728, filed on Jun. 16, 2016, provisional application No. 62/335,662, (Continued)

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1664* (2013.01); *H04L 1/18* (2013.01);
(Continued)

(58) Field of Classification Search
None
See application file for complete search history.

(56) References Cited

U.S. PATENT DOCUMENTS

| 2015/0358888 A1 | 12/2015 | Gulati et al. |
| 2018/0310298 A1* | 10/2018 | Li ......................... H04L 1/1671 |
| 2019/0044639 A1* | 2/2019 | Ouchi .................. H04W 52/38 |

FOREIGN PATENT DOCUMENTS

| KR | 1020160005002 | 1/2016 |
| WO | WO201616355 A1 * | 10/2016 |

OTHER PUBLICATIONS

Ericsson, "Uu Enhancements for V2X," 3GPP TSG RAN WG1 Meeting #84bis, dated Apr. 11-15, 2016, 5 pages.
(Continued)

*Primary Examiner* — James P Duffy
(74) *Attorney, Agent, or Firm* — Fish & Richardson P.C.

(57) ABSTRACT

The present invention relates to a Vehicle-to-X (V2X) operation method performed by a V2X terminal in a wireless communication system. Provided is the method comprising: receiving, from a base station, unicast data and multicast data, and transmitting, to the base station, an acknowledgment (ACK)/negative acknowledgement (NACK) for the unicast data and ACK/NACK for the multicast data, wherein the unicast data is data for the V2X terminal and the multicast data is data for a plurality of V2X terminals comprising the V2X terminal.

14 Claims, 18 Drawing Sheets

Related U.S. Application Data filed on May 12, 2016, provisional application No. 62/331,428, filed on May 3, 2016.

(51) Int. Cl.
  *H04W 4/06* (2009.01)
  *H04W 4/40* (2018.01)
  *H04L 1/16* (2006.01)
  *H04L 5/14* (2006.01)

(52) U.S. Cl.
  CPC .......... *H04L 1/1812* (2013.01); *H04L 1/1896* (2013.01); *H04L 5/00* (2013.01); *H04L 5/14* (2013.01); *H04W 4/06* (2013.01); *H04W 4/40* (2018.02)

(56) References Cited

OTHER PUBLICATIONS

Huawei, "Uu DL enhancements for V2X," 3GPP TSG RAN WG1 Meeting #84bis, dated Apr. 11-15, 2016, 7 pages.
Samsung, "PDSCH-based enhancements for V2X multicasting," 3GPP TSG RAN WG1 Meeting #84bis, dated Apr. 11-15, 2016, 7 pages.

* cited by examiner (g)

METHOD OF TRANSMITTING ACK/NACK MESSAGE IN WIRELESS COMMUNICATION SYSTEM AND TERMINAL USING SAME METHOD

CROSS-REFERENCE TO RELATED APPLICATIONS

This application is a National Stage application under 35 U.S.C. § 371 of International Application No. PCT/KR2017/004694, filed on May 2, 2017, which claims the benefit of U.S. Provisional Application No. 62/350,728, filed on Jun. 16, 2016, U.S. Provisional Application No. 62/335,662, filed on May 12, 2016, and U.S. Provisional Application No. 62/331,428, filed on May 3, 2016. The disclosures of the prior applications are incorporated by reference in their entirety.

BACKGROUND OF THE INVENTION

Field of the Invention

The present invention relates to wireless communication, and more particularly, to a method of transmitting an ACK/NACK message by a terminal (or a user equipment (UE)) in a wireless communication system and a terminal using the method.

Related Art

In the International Telecommunication Union Radio communication sector (ITU-R), the standardization task of International Mobile Telecommunication (IMT)-Advanced, that is, a next-generation mobile communication system after the $3^{rd}$ generation, is in progress. IMT-Advanced has an object of supporting multimedia services based on the Internet protocol (IP) at a transfer rate of 1 Gbps in the still and low-speed moving state and 100 Mbps in the high-speed moving state.

$3^{rd}$ Generation Partnership Project (3GPP) is a system standard that satisfies the requirements of IMT-Advanced and prepares LTE-advanced (LTE-A) improved from long term evolution (LTE) based on the orthogonal frequency division multiple access (OFDMA)/single carrier-frequency division multiple access (SC-FDMA) transmission method. LTE-A is one of strong candidates for IMT-Advanced.

There is recently a growing interest in the device-to-device (D2D) technology for direct communication between devices. Specifically, D2D has been in the spotlight as a communication technology for a public safety network. A commercial communication network rapidly changes into LTE, but the current public safety network is chiefly based on the 2G technology due to the problem of a collision against the existing communication standard and in terms of costs. Such a technology gap and needs for improved services lead to efforts to improve the public safety network.

The D2D communication described above may be extended to be applied to transmission and reception of signals between vehicles, and communication related to vehicles is specifically termed vehicle-to-everything (V2X) communication. In V2X, the alphabet 'X' represents a pedestrian (communication between a vehicle and a device carried by an individual (e.g., handheld terminal carried by a pedestrian, cyclist, driver, or passenger), here, V2X may be represented by V2P), a vehicle (communication between vehicles, here, V2V), an infrastructure/network (communication between a vehicle and a roadside unit (RSU)/network (e.g., RSU is a transportation infrastructure entity, (e.g., an entity transmitting speed notifications) implemented in an eNB or a stationary UE)) (V2I/N), and the like. A (V2P communication-related) device carried by a pedestrian (or a person) will be referred to as a "P-UE" and a (V2X communication-related) device installed in a vehicle will be referred to as a "V-UE". In the present disclosure, the term of "entity" may be interpreted as at least one of "P-UE", "V-UE", and RSU (/network/infrastructure).

In the related art, although the UE receives the multicast PDSCH, the UE does not transmit an ACK/NACK message (or information) for the multicast PDSCH. Accordingly, the related art base station in a multicast situation must transmit data regarding a terminal (e.g., a vehicle) within coverage of the base station, causing a problem that a payload size regarding data transmitted by the base station becomes excessively large.

Thus, hereinafter, a method regarding how a terminal will transmit ACK/NACK (ACK/NACK information or ACK/NACK message) for multicast data and a device using the same will be described.

SUMMARY OF THE INVENTION

The present invention provides a method of transmitting an ACK/NACK message by a terminal (or a user equipment (UE)) in a wireless communication system and a terminal using the same.

In an aspect, a vehicle-to-X (V2X) operation method performed by a V2X terminal in a wireless communication system is provided. The V2X operation method may comprise receiving, from a base station, unicast data and multicast data and transmitting, to the base station, an acknowledgement (ACK)/negative acknowledgement (NACK) for the unicast data and ACK/NACK for the multicast data, wherein the unicast data is data for the V2X terminal and the multicast data is data for a plurality of V2X terminals including the V2X terminal.

The V2X terminal may transmit ACK/NACK for the unicast data and ACK/NACK for the multicast data according to a payload size determined based on whether only the unicast data is received or whether the unicast data and the multicast data are simultaneously received.

The V2X terminal may transmit ACK/NACK for the unicast data and ACK/NACK for the multicast data according to a payload size determined based on whether the V2X terminal receives scheduling information regarding the multicast data.

The V2X terminal may transmit ACK/NACK for the unicast data and ACK/NACK for the multicast data based on reliability required for the unicast data and the multicast data.

When the V2X terminal transmits ACK/NACK for the unicast data and ACK/NACK for the multicast data, the V2X terminal may differently apply the number of resource elements used in uplink control information (UCI) piggyback of ACK/NACK for data required to have relatively high reliability and the number of resource elements used in UCI piggyback of ACK/NACK for data required to have relatively low reliability.

The number of resource elements used in UCI piggyback of ACK/NACK for the data required to have relatively high reliability may be greater than the number of resource elements used in UCI piggyback of ACK/NACK for the data required to have relatively low reliability.

When the V2X terminal transmits ACK/NACK for the unicast data and ACK/NACK for the multicast data, the V2X terminal may differently apply transmission power of ACK/NACK transmission for the data required to have relatively high reliability and transmission power of ACK/NACK transmission for the data required to have relatively low reliability.

The transmission power of ACK/NACK transmission for the data required to have relatively high reliability may be higher than the transmission power of ACK/NACK transmission for the data required to have relatively low reliability.

When a transmission time of ACK/NACK for the unicast data and a transmission time of ACK/NACK for the multicast data overlap, ACK/NACK for the unicast data and ACK/NACK for the multicast data may be transmitted based on priority.

The V2X terminal may delay transmission of ACK/NACK for data having relatively low priority.

The V2X terminal may drop transmission of ACK/NACK for data having relatively low priority.

The V2X terminal may transmit ACK/NACK for the data having relatively low priority according to a type of a downlink subframe associated with an uplink subframe in which transmission of ACK/NACK for the data having relatively low priority is performed.

The type of the downlink subframe may be determined by at least one of a system information block (SIB) time division duplex (TDD) uplink downlink setting, a downlink hybrid automatic repeat and request (HARQ) reference setting, and a downlink HARQ time line.

The V2X terminal may transmit ACK/NACK for data having relatively low priority on the basis of a downlink HARQ reference setting in a frequency division duplex (FDD) system.

In another aspect, a Vehicle-to-X (V2X) user equipment (UE) is provided. The UE may comprise a radio frequency (RF) unit transmitting and receiving a radio signal and a processor coupled to the RF unit to operate, wherein the processor receives, from a base station, unicast data and multicast data; and transmits, to the base station, an acknowledgement (ACK)/negative acknowledgement (NACK) for the unicast data and ACK/NACK for the multicast data, wherein the unicast data is data for the V2X UE and the multicast data is data for a plurality of V2X UEs including the V2X UE.

According to the present invention, transmission of ACK/NACK for multicast data may be proposed. That is, since a terminal transmits ACK/NACK for multicast data, a base station (BS) may determine whether to retransmit the previously transmitted data, and, in re-transmitting data, waste of resource due to retransmission may be reduced. In addition, according to the present invention, since specific methods for performing ACK/NACK transmission on multimedia data are provided and ACK/NACK transmission is performed on multicast data according to priority, reception of more important data may be guaranteed (that is, reliability of data reception may be increased).

DESCRIPTION OF EXEMPLARY EMBODIMENTS

Figure 1:
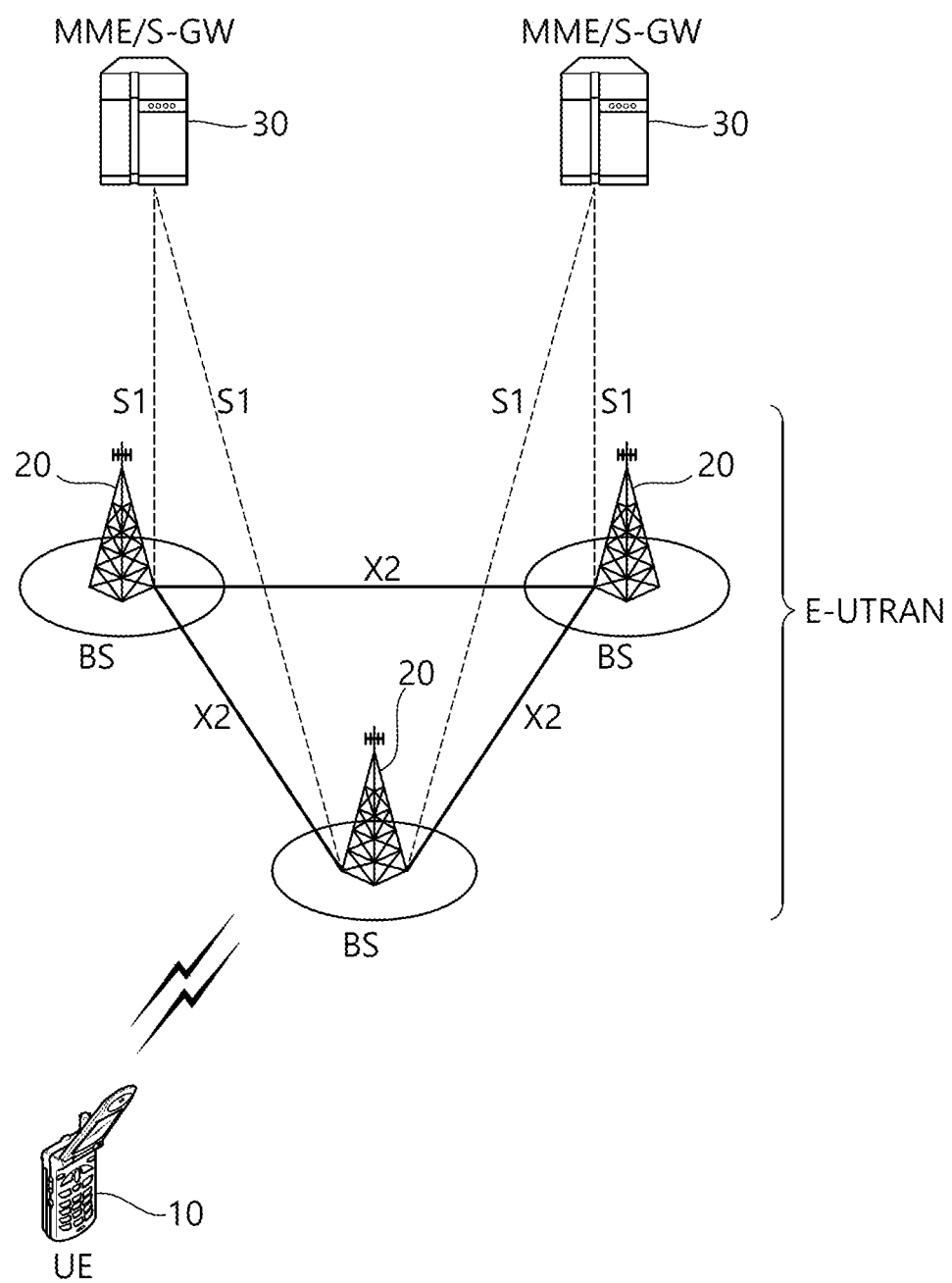
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 2:
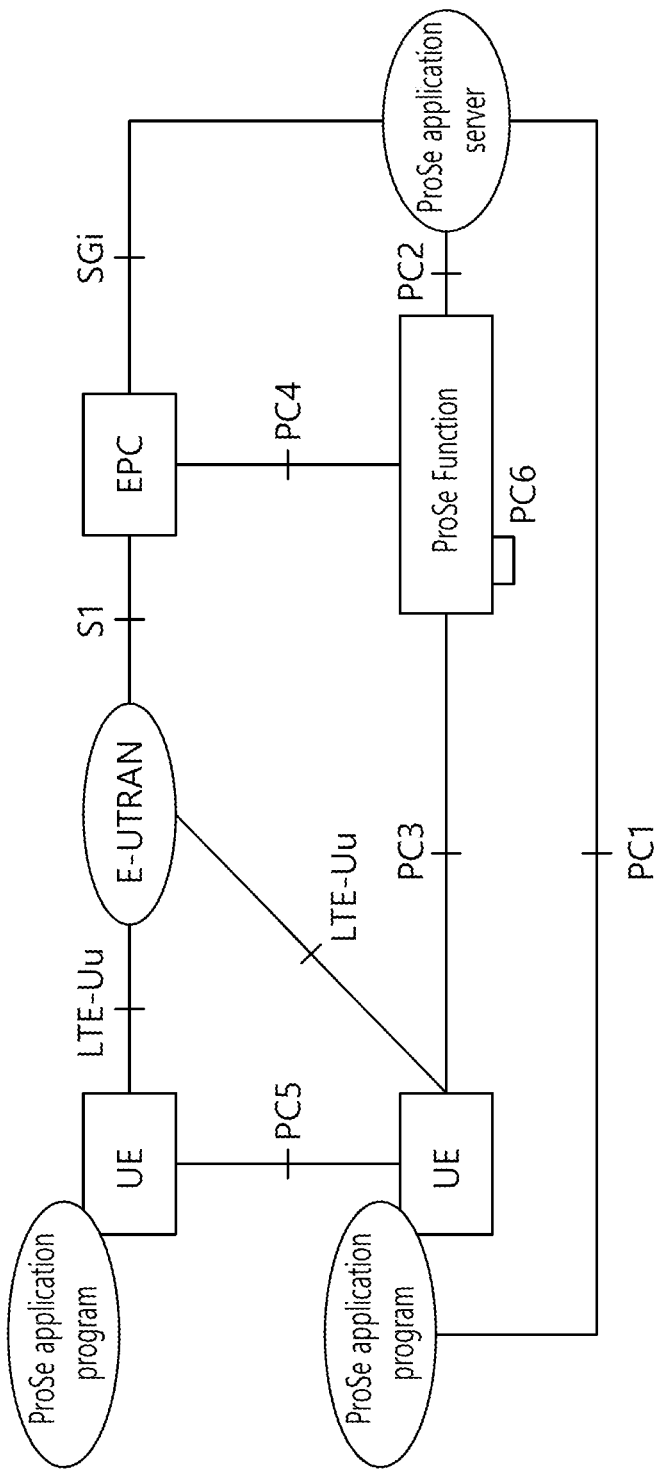
FIG. 2 illustrates a reference structure for a ProSe.

FIG. 2 illustrates a reference structure for a ProSe.

Referring to FIG. 2, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications
Authorization and configuration of the UE for discovery and direct communication)
Enable the function of the EPC level ProSe discovery
ProSe related new subscriber data and handling of data storage, and also handling of ProSe identities
Security related function
Provide control towards the EPC for policy related function
Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 3:
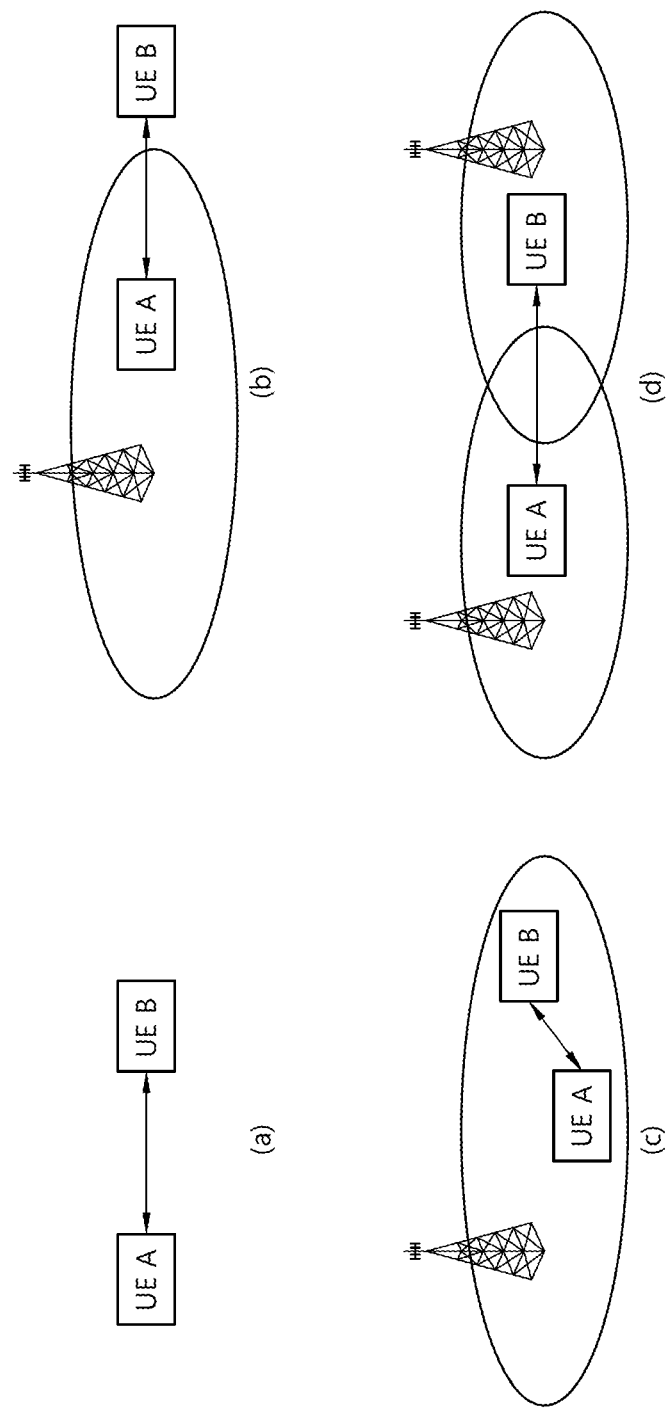
FIG. 3 illustrates arrangement examples of terminals performing ProSe direct communication and cell coverage.

FIG. 3 illustrates arrangement examples of terminals performing ProSe direct communication and cell coverage.

Referring to FIG. 3(a), UEs A and B may be located outside of the cell coverage. Referring to FIG. 3(b), the UE A may be located in the cell coverage and the UE B may be located outside of the cell coverage. Referring to FIG. 3(c), both of UEs A and B may be located in the cell coverage. Referring to FIG. 3(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 4:
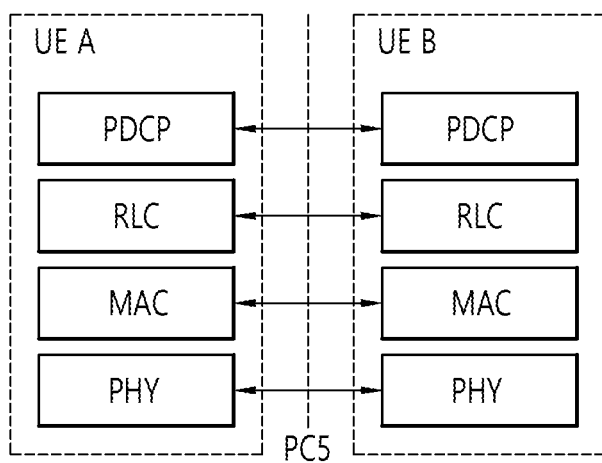
FIG. 4 illustrates a user plane protocol stack for the ProSe direct communication.

FIG. 4 illustrates a user plane protocol stack for the ProSe direct communication.

Referring to FIG. 4, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 5:
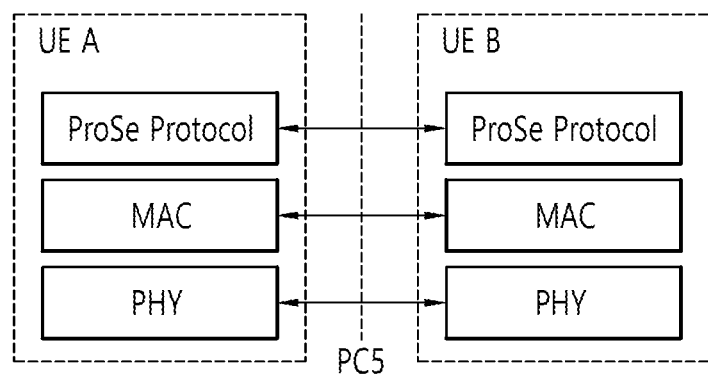
FIG. 5 illustrates a PC 5 interface for D2D discovery.

FIG. 5 illustrates a PC 5 interface for D2D discovery.

Referring to FIG. 5, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

<V2X (VEHICLE-TO-X) Communication>

As described above, in general, a D2D operation may have various advantages in that it is signal transmission/reception between close devices. For example, a D2D terminal may perform data communication at a high transfer rate and with low latency. Furthermore, the D2D operation can distribute traffic concentrated on an eNB. If a terminal performing a D2D operation plays the role of a relay, the D2D operation may also function to extend coverage of an eNB. Communication related to a vehicle, including signal transmission/reception between vehicles as the extension of the aforementioned D2D communication, is specially called VEHICLE-TO-X (V2X) communication.

In this case, for example, in V2X (VEHICLE-TO-X), a term "X" means A PEDESTRIAN (COMMUNICATION BETWEEN A VEHICLE AND A DEVICE CARRIED BY AN INDIVIDUAL (example) HANDHELD TERMINAL CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (example) RSU IS A TRANSPORTATION INFRASTRUCTURE ENTITY (example) AN ENTITY TRANSMITTING SPEED NOTIFICATIONS) IMPLEMENTED IN AN eNB OR A STATIONARY UE)) (V2I/N), etc. Furthermore, for example, for convenience of description of proposed methods, a device (related to V2P communication) carried by a pedestrian (or person) is named a "P-UE", and a device (related to V2X communication) installed on a vehicle is named a "V-UE." Furthermore, in the present invention, for example, a term "entity" may be construed as being a P-UE and/or a V-UE and/or an RSU (/NETWORK/INFRASTRUCTURE).

A V2X UE may perform message (or channel) transmission on a previously defined (or signaled) resource pool. In this case, the resource pool may mean a resource(s) previously defined so that the UE performs a V2X operation (or capable of performing the V2X operation). In this case, the resource pool may be defined from the viewpoint of time-frequency, for example.

Hereinafter, PUCCH formats will be described.

Figure 6:
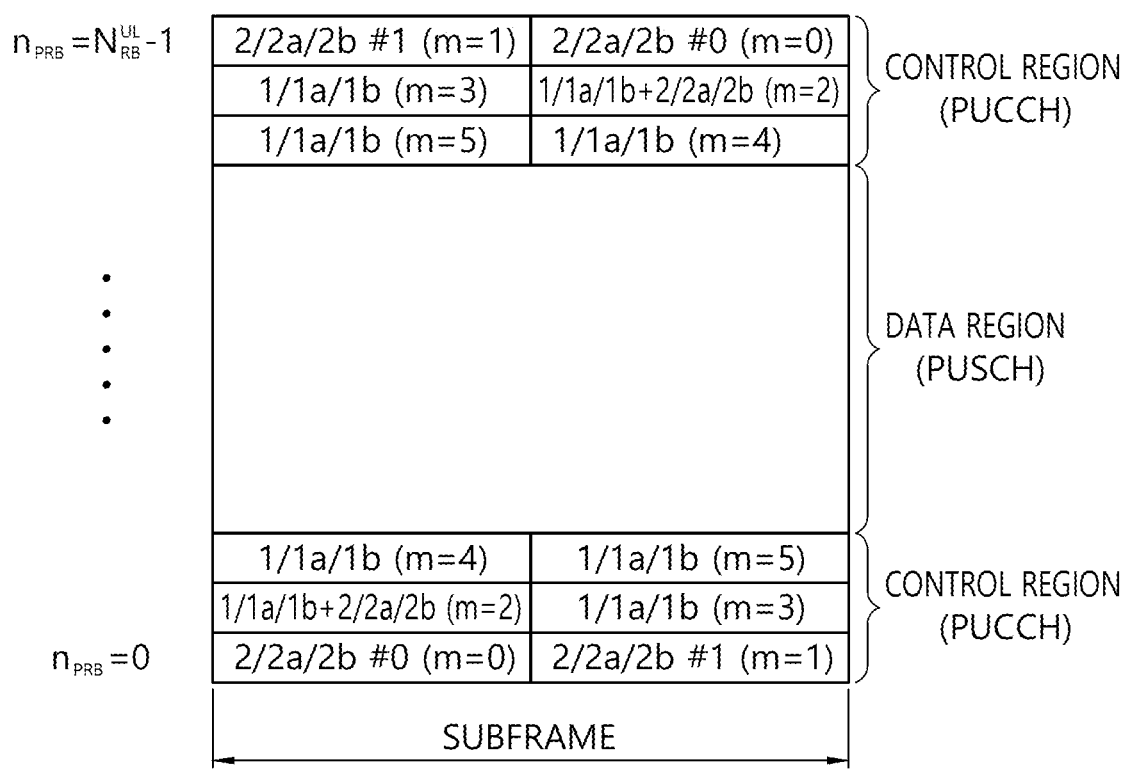
FIG. 6 is a view illustrating transmission regions according to PUCCH formats.

FIG. 6 is a view illustrating transmission regions according to PUCCH formats.

PUCCH formats will be described with reference to FIG. 6.

PUCCH format 1 carries a scheduling request (SR). Here, an on-off keying (OOK) method may be applied. PUCCH format 1a carries acknowledgement/non-acknowledgement (ACK/NACK) modulated according to binary phase shift keying (BPSK) scheme for one codeword. PUCCH format 1b carries ACK/NACK modulated according to quadrature phase shift keying (QPSK) scheme for two codewords. PUCCH Format 2 carries a channel quality indicator (CQI) modulated according to the QPSK scheme. PUCCH formats 2a and 2b carry CQI and ACK/NACK.

Following table illustrates PUCCH formats.

TABLE 1

| Format | Modulation scheme | Total bit number per subframe | Description |
| --- | --- | --- | --- |
| Format 1 | Undecided | Undecided | Scheduling request (SR) |
| Format 1a | BPSK | 1 | ACK/NACK of 1-bit hybrid automatic repeat request (HARQ) and SR may be received or not |
| Format 1b | QPSK | 2 | ACK/NACK of 2-bit HARQ and SR may be received or not |
| Format 2 | QPSK | 20 | Channel state information (CSI) and 1-bit or 2-bit HARQ ACK/NACK in the case of extended CP |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | A plurality of ACKs/NACKs for carrier aggregation, CSI, and SR may be received or not |

Each PUCCH format is mapped to and transmitted in a PUCCH region. For example, the PUCCH formats 2/2a/2b are mapped to resource blocks (m=0.1 in FIG. 6) at the edges of bands allocated to a terminal (or a user equipment (UE)). A mixed PUCCH resource block may be mapped to a resource block (e.g., m=2) adjacent in a direction of the center of the band to resource blocks to which the PUCCH formats 2/2a/2b are allocated. The PUCCH formats 1/1a/1b in which a scheduling request (SR) ACK/NACK are transmitted may be disposed in a resource block in which m=4 or m=5. The number of resource blocks (N (2)RB) that may be used in the PUCCH formats 2/2a/2b in which a CQI is transmitted may be indicated to the terminal via a broadcasted signal.

Figure 7:
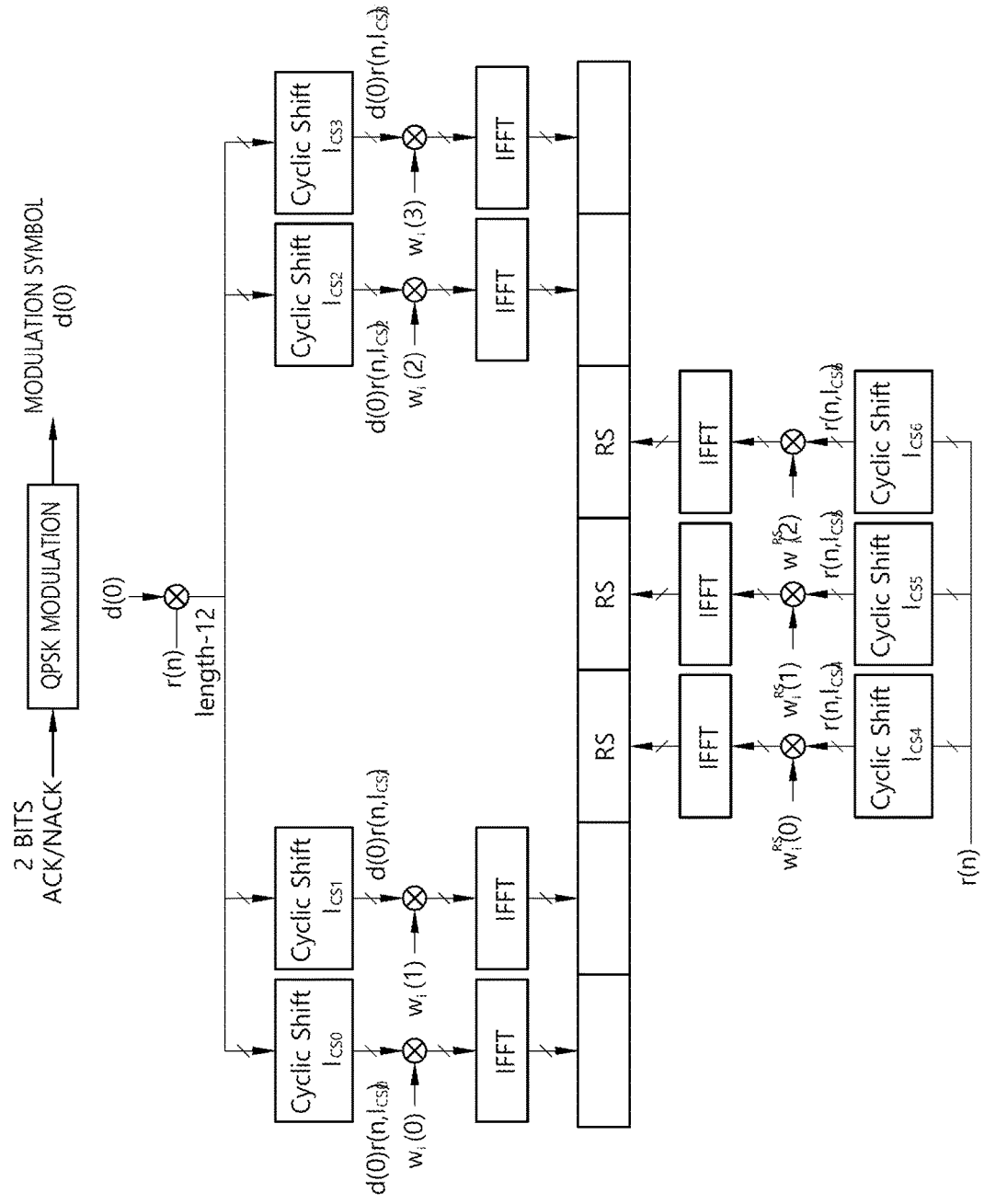
FIG. 7 illustrates a channel structure of the PUCCH format 1b in a normal CP.

FIG. 7 illustrates a channel structure of the PUCCH format 1b in a normal CP.

One slot includes seven OFDM symbols, in which three OFDM symbols are reference signals for demodulation, i.e., demodulation reference signal (DMRS) OFDM symbols and four OFDM symbols are data OFDM symbols for ACK/NACK signals.

In the PUCCH format 1b, a 2-bit encoded ACK/NACK signal is quadrature phase shift keying (QPSK)-modulated to generate a modulation symbol d (0).

A cyclic shift (CS) index $I_{cs}$ may vary according to slot number ($n_s$) in a radio frame and/or a symbol index (1) in a slot.

Since there are four data OFDM symbols for transmission of ACK/NACK signals in one slot in the normal CP, it is assumed that CS indices respectively corresponding to the data OFDM symbols are $I_{cs0}$, $I_{cs1}$, $I_{cs2}$, and $I_{cs3}$.

The modulation symbol d (0) is spread to the cyclic-shifted sequence r ($n, I_{cs}$). When a one-dimensional spread sequence corresponding to an (i+1)-th OFDM symbol in the slot is m (i), it may be indicated by
{m (0), m (1), m (2), m (3)}={d (0)r ($n, I_{cs0}$), d (0)r ($n, I_{cs1}$), d (0)r ($n, I_{cs2}$), d (0)r ($n, I_{cs3}$)}.

In order to increase terminal capacity, the one-dimensional spread sequence may be spread using an orthogonal sequence. An orthogonal sequence $w_i(k)$ (I is a sequence index and $0 \leq k \leq K-1$) in which a spreading factor K is 4 (K=4) uses the following sequence.

TABLE 2

| Index (i) | K = 4<br>[$w_i$ (0), $w_i$ (1), $w_i$ (2), $w_i$ (3)] | K = 3<br>[$w_i$ (0), $w_i$ (1), $w_i$ (2)] |
| --- | --- | --- |
| 0 | [+1, +1, +1, +1] | [+1, +1, +1] |
| 1 | [+1, −1, +1, −1] | [+1, $e^{j2\pi/3}$, $e^{j4\pi/3}$] |
| 2 | [+1, −1, −1, +1] | [+1, $e^{j4\pi/3}$, $e^{j2\pi/3}$] |

Each slot may use different spreading factors.

Thus, when a certain orthogonal sequence index i is given, a two-dimensional spread sequence {s (0), s (1), s (2), s (3)} may be represented as follows.

{s (0), s (1), s (2), s (3)}={$w_i(0)$m (0), $w_i(1)$m (1), $w_i(2)$m (2), $w_i(3)$m (3)}

The two-dimensional spread sequences {s (0), s (1), s (2), s (3)} are subjected to inverse fast Fourier transform (IFFT) and subsequently transmitted in a corresponding OFDM symbol. Accordingly, an ACK/NACK signal is transmitted on a PUCCH.

A reference signal of the PUCCH format 1b is also transmitted by cyclically shifting the basic sequence r (n) and spreading it to an orthogonal sequence. When cyclic shifted indices corresponding to three RS OFDM symbols are $I_{cs4}$, $I_{cs5}$, $I_{cs6}$, three cyclically shifted sequences r ($n, I_{cs4}$), r ($n, I_{cs5}$), r ($n, I_{cs6}$) may be obtained. The three cyclically shifted sequences are spread to an orthogonal sequence $w^{RS}_i(k)$ in which K=3.

The orthogonal sequence index i, the cyclic shift index $I_{cs}$, and the resource block index m are parameters necessary for constructing the PUCCH and are resources used to identify the PUCCH (or terminal). If the number of available cyclic shifts is 12 and the number of available orthogonal sequence indices is 3, PUCCHs for a total of 36 terminals may be multiplexed into one resource block.

In 3GPP LTE, a resource $n^{(1)}{}_{PUCCH}$ is defined in order for a UE to obtain the above three parameters for configuring a PUCCH. The resource index is defined as $n^{(1)}{}_{PUCCH} = n_{CCE} + N^{(1)}{}_{PUCCH}$, in which $n_{CCE}$ is the number of a first CCE used for transmission of a corresponding PDCCH (i.e., PDCCH including a downlink resource allocation (DCI) scheduling downlink data corresponding to an ACK/NACK signal, and $N^{(1)}{}_{PUCCH}$ is a parameter informed by the BS to the UE through a higher layer message.

Time, frequency, and code resources used for transmission of an ACK/NACK signal are known as ACK/NACK resources or PUCCH resources. As described above, the index of the ACK/NACK resource (ACK/NACK resource index or PUCCH index) required for transmitting the ACK/NACK signal on the PUCCH may be expressed as at least any one of the orthogonal sequence index i, the cyclic shift index $I_{cs}$, the resource block index m and an index for obtaining the three indices. The ACK/NACK resource may include at least one of an orthogonal sequence, a cyclic shift, a resource block, and a combination thereof.

Figure 8:
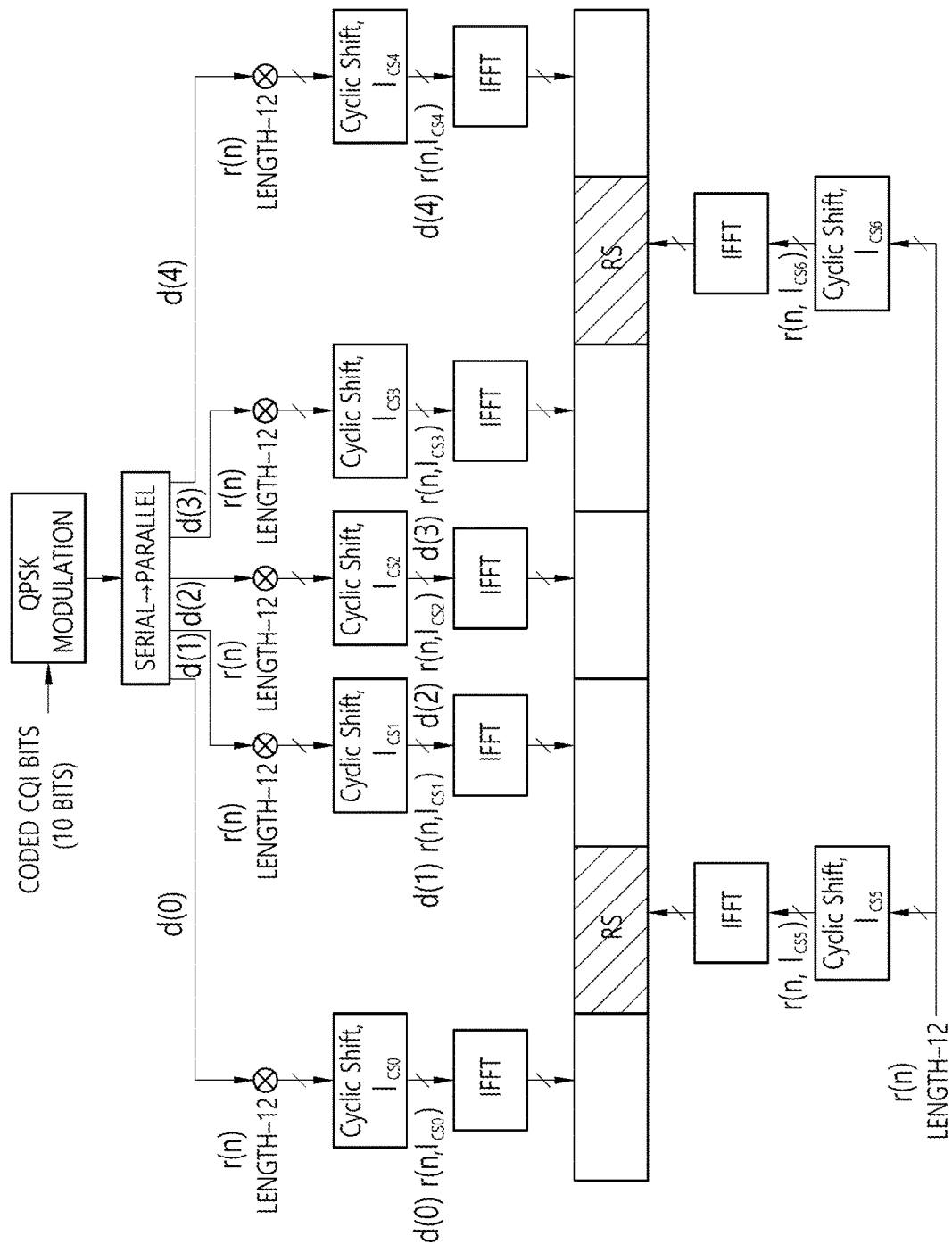
FIG. 8 illustrates a channel structure of the PUCCH formats 2/2a/2b in a normal CP.

FIG. 8 illustrates a channel structure of the PUCCH formats 2/2a/2b in a normal CP.

Referring to FIG. 8, in the normal CP, OFDM symbols 1 and 5 (i.e., second and sixth OFDM symbols) are used for the reference signals DMRS for demodulation and the other remaining OFDM symbols are used for CQI transmission. In the case of the extended CP, OFDM symbol 3 (fourth symbol) is used for the DMRS.

Ten CQI information bits are channel-coded at a 1/2 code rate, for example, to become 20 coded bits. Reed-Muller codes may be used for channel coding. Then, the coded bits are scrambled and subsequently QPSK constellation-mapped to generate QPSK modulation symbols (d (0) to d (4) in slot 0). Each QPSK modulation symbol is modulated by cyclic shifting of the basic RS sequence (r (n)) having a length of 12, IFFT-ed, and subsequently transmitted in each of ten SC-FDMA symbols of the subframe. The 12 uniformly spaced cyclic shifts allows twelve different UEs to be orthogonally multiplexed in the same PUCCH resource block. The RS sequence applied to OFDM symbols 1 and 5 may be a basic RS sequence r (n) having a length of 12.

Figure 9:
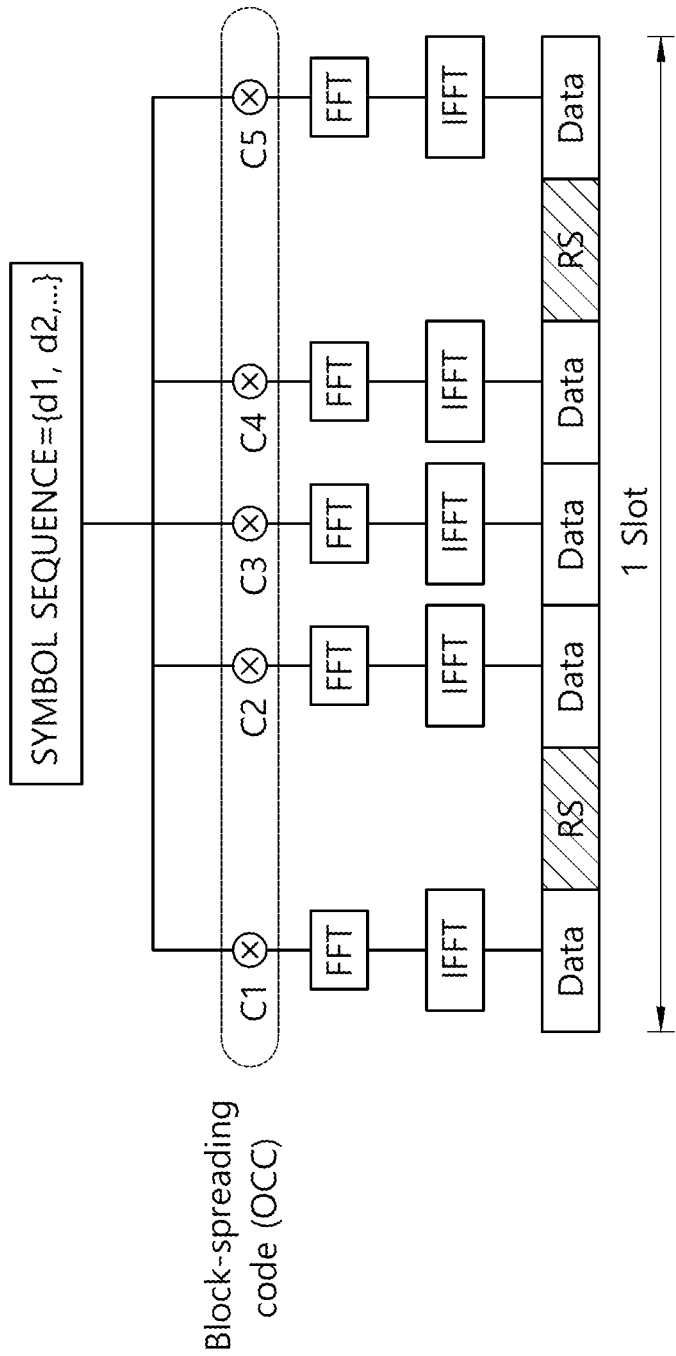
FIG. 9 illustrates a channel structure of the PUCCH format 3.

FIG. 9 illustrates a channel structure of the PUCCH format 3.

Referring to FIG. 9, the PUCCH format 3 uses a block spreading scheme. The block spreading scheme refers to a method of spreading a symbol sequence in which a multi-bit ACK/NACK is modulated using a block spreading code in a time domain.

In the PUCCH format 3, a symbol sequence (e.g., an ACK/NACK symbol sequence) is spread by a block spreading code in a time domain and transmitted. An orthogonal cover code (OCC) may be used as the block spreading code. Control signals of the plurality of terminals may be multiplexed by the block spreading code. In the PUCCH format 2, the symbols (e.g., d (0), d (1), d (2), d (3), d (4), etc. of the FIG. 8) transmitted in each data symbol are different and terminal multiplexing is performed using the cyclic shift of the constant amplitude zero auto-correlation (CAZAC) sequence. In contrast, in the PUCCH format 3, a symbol sequence including one or more symbols is transmitted in the frequency domain of each data symbol and spread by the block spreading code in the time domain to perform terminal multiplexing. In FIG. 9, a case where two DMRS symbols are used in one slot is illustrated, but the present disclosure is not limited thereto and three DMRS symbols may be used and an orthogonal cover code having 4 as a spreading factor value may also be used. The DMRS symbols may be generated from a CAZAC sequence having a specific cyclic shift and may be transmitted in a form in which a plurality of DMRS symbols in a time domain are multiplied by a specific orthogonal cover code.

Hereinafter, an MBMS will be described.

Figure 10:
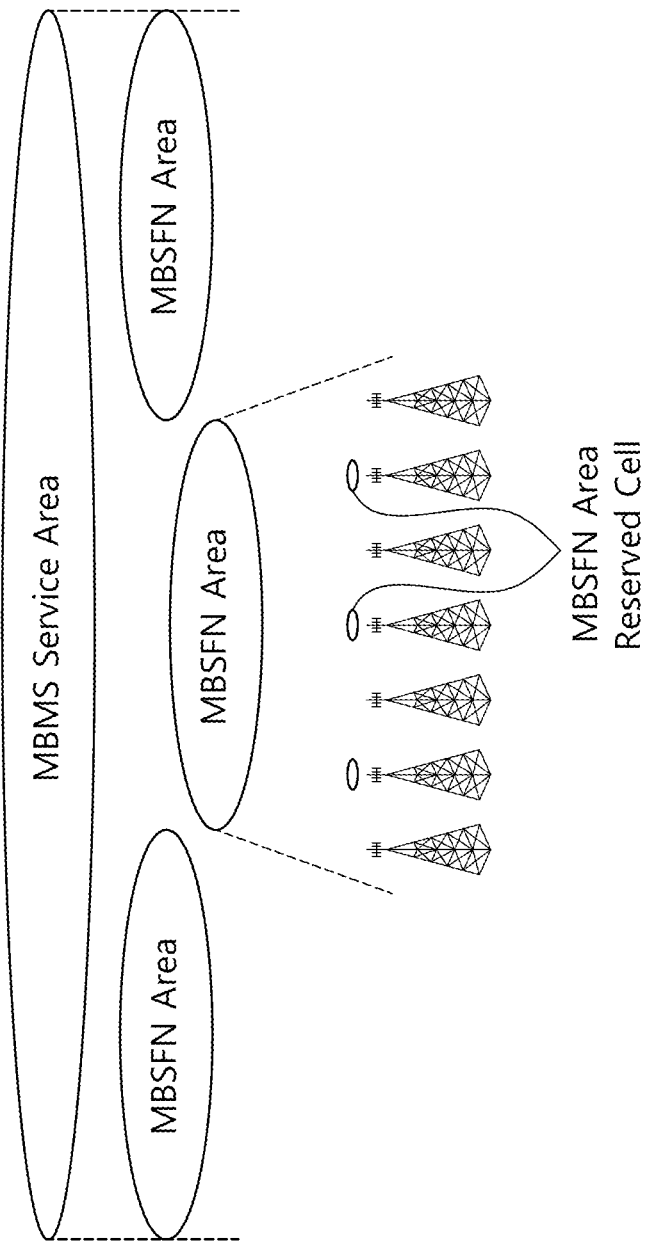
FIG. 10 illustrates a multimedia broadcast/multicast service (MBMS).

FIG. 10 illustrates a multimedia broadcast/multicast service (MBMS).

An MBMS may be a communication technique capable of transmitting the same data from one transmission end to a plurality of reception ends. The MBMS may be used to provide a broadcast service using a cellular network.

A single frequency network (SFN) refers to a network in which different transmission terminals simultaneously transmit the same data through the same frequency. MBNS single frequency network (MBSFN) refers to that multiple different BSs simultaneously transmit the same data to provide the MBMS service.

MBSFN synchronization area refers to a network area where all BSs may be synchronized and may perform MBSFN transmission. The MBSFN synchronization area may support one or more MBSFN areas. In a given frequency layer, one BS may be included in only one MBSFN synchronization area.

MBSFN transmission or transmission in MBSFN mode: The same waveform may be simultaneously transmitted from a plurality of cells, and MBSFN transmission from the plurality of cells in the MBSFN area may be seen as a single transmission to the UE.

The MBSFN area includes a group of cells within the MBSFN synchronization area of the network and may be cells cooperating to perform MBSFN transmission. Cells in the MBSFN area, excluding an MBSFN area reserved cell, contribute to the MBSFN transmission. That is, the MBSFN area may refer to a set of cells providing the same MBSFN service.

The MBSFN area reserved cell refers to a cell in the MBSFN area, which does not contribute to the MBSFN transmission. This cell may be allowed for transmission for other services, but only limited transmission power may be allowed in resource allocated for MBSFN transmission.

A synchronization sequence may be used for the MBMS service, and a synchronization period for indicating a start time of the synchronization sequence may be defined.

In an E-UTRAN, MBMS may be provided in a single frequency network mode, i.e., MBSFN. When the MBMS is provided through the MBSFN, the MBMS may be provided through the MBSFN in a frequency that shares non-MBMS services, i.e., a set of cells supporting both unicast and MBMS transmission (MBMS/unicast-mixed cells). It is possible to receive the MBMS in an RRC connected state or an RRC idle state of the UE.

Hereinafter, enhanced MBMS is termed as eMBMS or E-MBMS, which refers to an advanced MBMS. The E-MBMS may operate in an LTE/LTE-A network.

Figure 11:
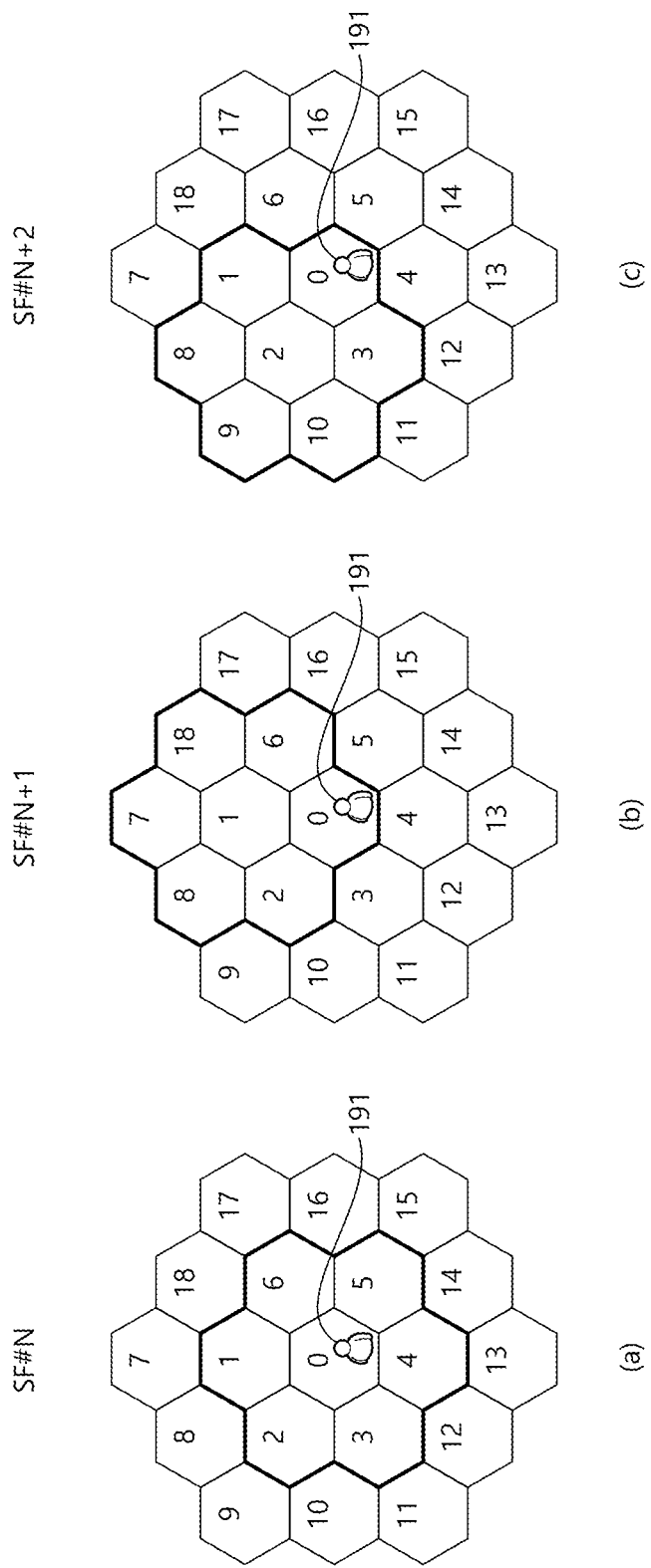
FIGS. 11 to 13 are diagrams illustrating a case where a vehicle terminal # K (V-terminal # K) 191 located in coverage of cell #0 (or RRC-connected with cell #0) simultaneously receives specific cell-related V2X messages from a plurality of cells in each of predefined or signaled time resource unit.
Figure 12:
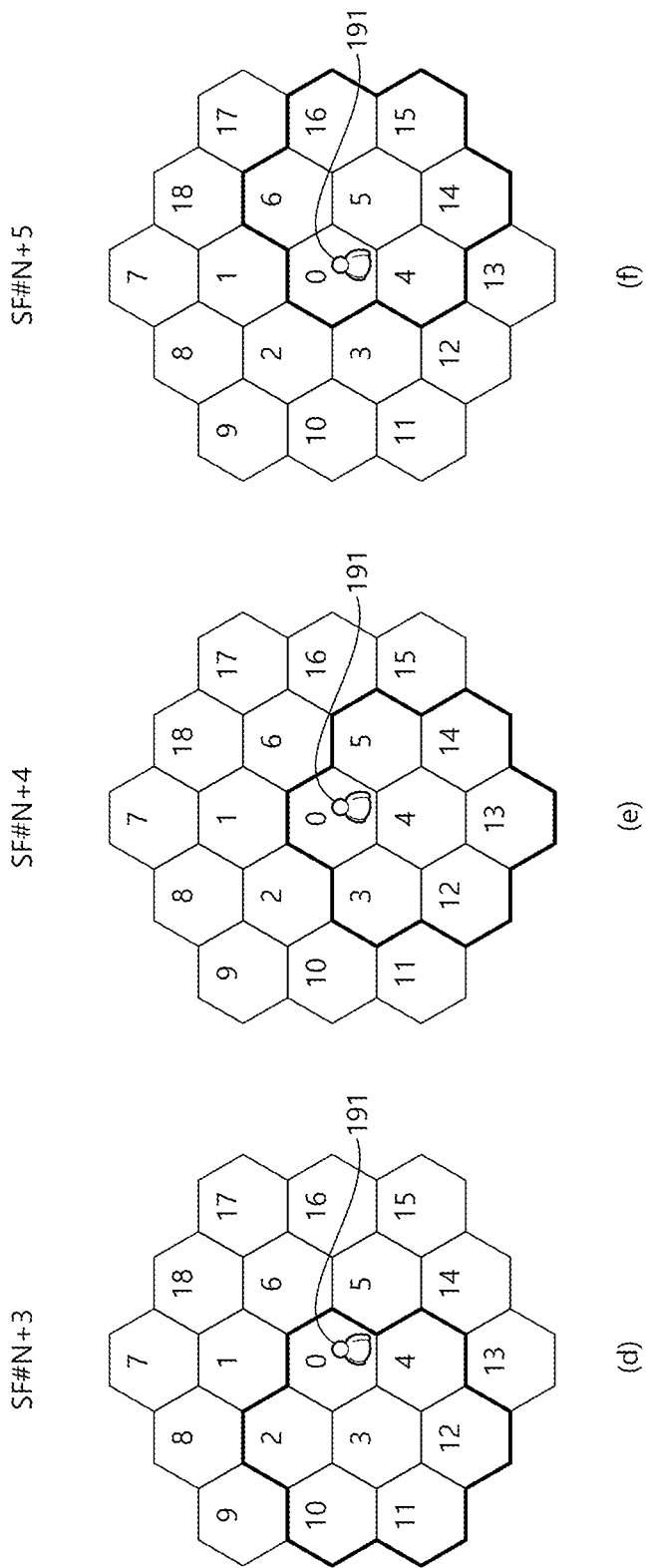
Figure 13:
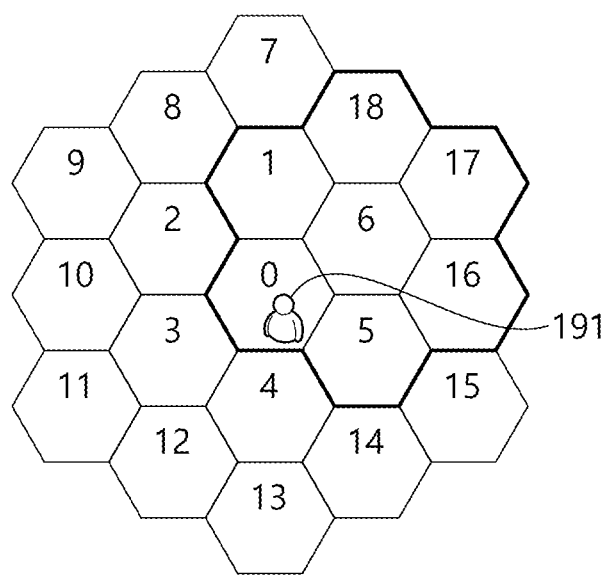

FIGS. 11 to 13 are diagrams illustrating a case where a vehicle terminal # K (V-terminal # K) 191 located in coverage of cell #0 (or RRC-connected with cell #0) simultaneously receives specific cell-related V2X messages from a plurality of cells in each of predefined or signaled time resource unit.

Referring to FIG. 11 (*a*), the V-terminal # K 191 simultaneously receives cell #0 related V2X messages in a subframe # N from cells #0/1/2/3/4/5/6 (which will be referred to as a 'cell group #0'). Referring to FIG. 11 (*b*), the V-terminal # K 191 simultaneously receives cell #1 related V2X messages in a subframe # (N+1) from cells #0/1/2/6/7/8/18 (which will be referred to as a 'cell group #1'). Referring to FIG. 11 (c), the V-terminal # K 191 simultaneously receives cell #2 related V2X messages in a subframe # (N+2) from cells #0/1/2/3/8/9/10 (which will be referred to as a 'cell group #2').

Referring to FIG. 12 (a), the V-terminal # K 191 simultaneously receives cell #3 related V2X messages in a subframe # (N+3) from cells #0/2/3/4/10/11/12 (which will be referred to as a 'cell group #3'). Referring to FIG. 12 (b), the V-terminal # K 191 simultaneously receives cell #4 related V2X messages in a subframe # (N+4) from cells #0/3/4/5/12/13/14 (which will be referred to as a 'cell group #4'). Referring to FIG. 12 (c), the V-terminal # K 191 simultaneously receives cell #5 related V2X messages in a subframe # (N+5) from cells #0/4/5/6/14/15/16 (which will be referred to as a 'cell group #5').

Referring to FIG. 13, the V-terminal # K 191 simultaneously receives cell #6 related V2X message in a subframe # (N+6) from the cells #0/1/5/6/16/17/1 (which will be referred to as a 'cell group #6').

In FIGS. 11 to 13, the term of cell group may be interpreted as an MBSFN area (or a single-cell point-to-multipoint (SCPTM) area), and the cell group #0/1/2/3/4/5/6 may be regarded as seven MBSFN areas (or SCPTM areas) to which cell #0 belongs.

In FIGS. 11 to 13, it may be assumed that all the cell groups (or MBSFN areas or SCPTM areas) are matched in related time/frequency synchronization or differences in time/frequency synchronization are all smaller than a predefined or signaled threshold value.

Hereinafter, the SCPTM will be described.

Important communications technologies such as public safety and group communication system enablers for LTE (GCSE_LTE) were introduced in Rel-12. In Rel-12 GCSE, group communication was designated as eMBMS. EMBMS was designed to provide media content to a previously planned large area (i.e., MBSFN area). The MBSFN area is rather static (e.g., set by O&M) and may not be dynamically adjusted according to user distributions. Although all the radio resources in the frequency domain are not used, the eMBMS transmission occupies the entire system bandwidth and unicast and multiplexing are not allowed in the same subframe. The MBSFN subframe setting is also rather static (e.g., set by O&M). That is, the MBSFN subframe cannot be dynamically adjusted according to the number of dynamic groups and traffic loads of the dynamic groups. Therefore, when providing important communication services, radio resource setting for the eMBMS may be unnecessarily wasted.

Therefore, SCPTM transmission has been proposed for efficient use of radio resources. The MBSFN transmission is a transmission signals that can be simultaneously identifiable in a plurality of cells, while SCPTM transmission is transmission of an MBMS service in a single cell.

Hereinafter, the present invention will be described.

The UE may receive a multicast PDSCH and a unicast PDSCH, and the UE may receive the multicast PDSCH and the unicast PDSCH as MUX data in an FDM format. Here, the multicast PDSCH (or multicast data), which is data for a plurality of terminals, may refer to data transmitted by the BS to UEs within coverage of the BS. In the case of V2X communication, the BS may transmit multicast data, and here, the multicast data in V2X communication may refer to a V2X message to be listened to by a plurality of vehicles. Also, the unicast PDSCH (or unicast data) may refer to data transmitted by the BS for a specific UE.

In the related art case, although the UE receives the multicast PDSCH, the UE does not transmit an ACK/NACK message (or information) for the multicast PDSCH. Thus, the related art BS in a multicast situation must transmit data regarding a UE (e.g., a vehicle) within coverage of the BS, causing a problem that a payload size regarding data transmitted by the BS becomes excessively large.

In order to solve the problem, transmission of ACK/NACK for multicast data is proposed. That is, by causing the UE to transmit ACK/NACK for the multicast data, the BS may determine whether to retransmit the previously transmitted data, and in retransmitting the data, the BS may resource waste of resource that may be caused by retransmission.

Hereinafter, how a UE transmits ACK/NACK (or ACK/NACK information or ACK/NACK message) for multicast data will be described in detail.

The proposed schemes propose a method for effectively multiplexing (/reporting), by a V2X UE (s), 'multicast (/broadcast) data (/PDSCH)-related ACK/NACK information (M_ACK/NACK information)' and 'unicast data (/PDSCH)-related ACK/NACK information (U_ACK/NACK information)'. Here, for example, the proposed schemes of the present invention may be extendedly applied even for multiplexing (/reporting) various types of feedback information (related to 'multicast (/broadcast) data (/PDSCH)' and 'unicast data (PDSCH)') as well as 'ACK/NACK information'.

Figure 14:
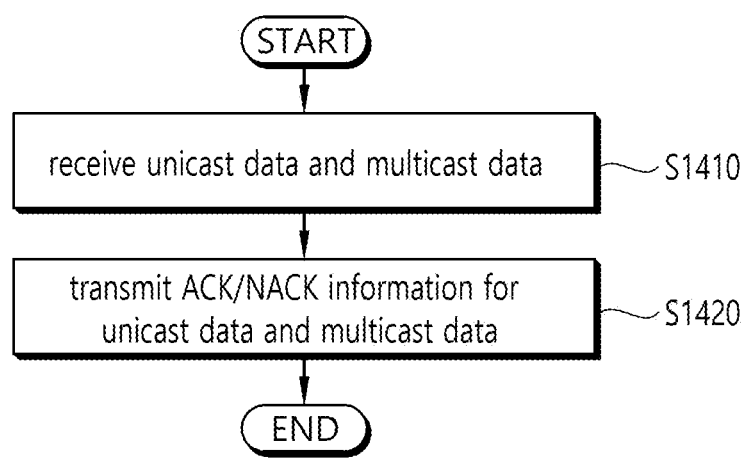
FIG. 14 is a flowchart illustrating a method of transmitting ACK/NACK for unicast data and multicast data by a V2X UE according to an embodiment of the present invention.

FIG. 14 is a flowchart illustrating a method of transmitting ACK/NACK for unicast data and multicast data by a V2X UE according to an embodiment of the present invention.

According to FIG. 14, a UE may receive unicast data and multicast data (S1410). Here, the UE may receive the unicast data and the multicast data from a BS, and the BS may be a BS supporting single-cell point-to-multipoint (SCPTM). As described above, the multicast data may refer to data for a plurality of UEs, and the unicast data may refer to data transmitted by a base station for a specific UE.

Thereafter, the UE may transmit ACK/NACK information for the unicast data and the multicast data (S1420).

For example, the V2X UE may transmit ACK/NACK for the unicast data and ACK/NACK for the multicast data according to a payload size determined on the basis of whether only the unicast data has been received or whether the unicast data and the multicast data have been simultaneously received. Here, the V2X UE may transmit ACK/NACK for the unicast data and ACK/NACK for the multicast data according to a payload size determined based on whether the V2X UE has received scheduling information on the multicast data.

For example, the V2X UE may transmit ACK/NACK for the unicast data and ACK/NACK for the multicast data based on reliability requested for the unicast data and the multicast data. Here, when transmitting ACK/NACK for the unicast data and ACK/NACK for the multicast data, the V2X UE may differently apply the number of resource elements used for uplink control information (UCI) piggy back of ACK/NACK for the data required to have relatively high reliability and the number of resource elements used for UCI piggy back of ACK/NACK for the data required to have relatively low reliability. Here, the number of resource elements used for the UCI piggyback of ACK/NACK for the data required to have relatively high reliability may be greater than the number of resource elements used for the UCI piggyback of ACK/NACK for the data required to have relatively low reliability. Here, when transmitting ACK/NACK for the unicast data and ACK/NACK for the multicast data, the V2X UE may differently apply transmission power for ACK/NACK transmission for the data required to have relatively high reliability and transmission power for ACK/NACK transmission for the data required to have relatively low reliability. Here, the transmission power for ACK/NACK for the data required to have relatively high reliability may be higher than the transmission power for ACK/NACK for the data required to have relatively low reliability.

For example, in case where a transmission time of ACK/NACK for the unicast data and a transmission time of ACK/NACK for the multicast data overlap, the V2X UE may transmit ACK/NACK for the unicast data and ACK/NACK for the multicast data on the basis of priority. Here, the V2X UE may delay transmission of ACK/NACK for the data having a relatively low priority. Here, the V2X UE may drop transmission of ACK/NACK for the data having a relatively low priority. Here, the V2X UE may transmit ACK/NACK for the data having a relatively low priority according to a type of a downlink (DL) subframe associated with an uplink subframe in which transmission of ACK/NACK for the data having a relatively low priority. Here, the type of the downlink subframe may be determined by at least one of a system information block (SIB) time division duplex (TDD) uplink downlink setting, a downlink HARQ reference setting, and a downlink HARQ time line. Here, in the frequency division duplex (FDD) system, the V2X UE may transmit ACK/NACK for the data having a relatively low priority based on the downlink HARQ reference setting.

More specifically, a specific example in which the UE in FIG. 14 transmits ACK/NACK for unicast data and ACK/NACK for multicast data may be as follows.

[Proposed Method #1]

For example, when (PUCCH FORMAT 3 (PF3)) payloads having different sizes for a case (A) where only 'UNICAST DATA (/PDSCH)' is received and a case (B) where 'UNICAST DATA (/PDSCH)' and 'MULTICAST (/BRAODCAST) DATA (/PDSCH)' are simultaneously received, they may be defined to follow (some of) the following rules. Here, for example, when these rules are applied, the problem of discordance in understanding (assumption) between the BS and the V2X UE (s) regarding an overall (final) payload size (and/or a type of a channel coding technique (e.g., 'SINGLE RM CODE' or 'DUAL RM CODE')) that occurs as the V2X UE (s) fails to receive "MULTICAST (/BRAODCAST) DATA (/PDSCH)' or related GRANT (M_GRANT).

(Rule #1-1)

In case where scheduling presence/absence (/number) information related to 'MULTICAST (/BRAODCAST) DATA (/PDSCH)' is not signaled through 'UNICAST DL GRANT (U_DL GRANT), if 'ANY DATA (/PDSCH)' is received, (overall) payload having a maximum ACK/NACK size of '{UNICAST DATA (/PDSCH) (M number)+MULTICAST (/BRAODCAST) DATA (/PDSCH) (N number)}' is configured all the time and transmitted, without distinguishing between 'UNICAST DATA (/PDSCH)' and 'MULTICAST (/BRAODCAST) DATA (/PDSCH)'.

Here, N may be determined by the number of times multicast data is received at different timings during one period. For example, in case where a total of six BSs are adjacent to a BS in which the V2X UE is currently located, the V2X UE receives the multicast data from the BSs a total of seven times (1 (the BS in which the V2X UE is located)+6 (the BSs adjacent to the BS in which the V2X UE is located)=7), and thus, N may be determined as 7.

In addition, transmitting the multicast data, which are received by the V2X UE at different timings, at the same time together with the unicast data may mean that the UE performs ACK/NACK transmission through bundling, for example.

Here, for example, a relationship of 'M≤N' (e.g., 'M' may be interpreted as 'UNICAST DATA (/PDSCH) BUNDLING WINDOW SIZE') is established. Here, for example, the value of 'N' may be predefined or signaled from the network. For example, (Rule #1-1) may be applied to (all the) cases where ACK/NACK information is transmitted through 'PUCCH' (e.g., PUCCH FALLBACK CASE' (in which ACK/NACK information is transmitted by 'FP1A/1B')) may be excluded) and/or PUSCH piggy back'.

(Rule #1-2)

In case where scheduling presence or absence (/number) information related to 'MULTICAST (/BRAODCAST) DATA (/PDSCH)' is signaled through 'U_DL GRANT', (A) if only 'MULTICAST (/BRAODCAST) DATA (/PDSCH)' is received, the (overall) payload is configured to have a maximum ACK/NACK size of '{UNICAST DATA (/PDSCH) (M number)+MULTICAST (/BRAODCAST) DATA (/PDSCH) (N number)}' is configured and transmitted, and (B) if 'UNICAST DATA (/PDSCH)' is received, the (overall) payload is configured to have an ACK/NACK size according to the scheduling presence or absence (/number) information related to 'MULTICAST (/BRAODCAST) DATA (/PDSCH)' (on 'U_DL GRANT') (e.g., '{UNICAST DATA (/PDSCH) ONLY (M number)}', '{UNICAST DATA (/PDSCH) (M number)+MULTICAST (/BRAODCAST) DATA (/PDSCH) (N number)}') and transmitted. Here, for example, in case where 'U_DL GRANT' is transmitted through a CSS (COMMON SEARCH SPACE) and/or in case where 'UNICAST DATA (/PDSCH)' is transmitted on the basis of SPS (SEMI-PERSISTENT SCHEDULING), the scheduling presence or absence (/number) information (field) related to 'MULTICAST (/BRAODCAST) DATA (/PDSCH)' may not be present on the 'U_DL GRANT'. In this case, for example, if only 'UNICAST DATA (/PDSCH)' is received, a maximum ACK/NACK size (e.g., '{(UNICAST DATA (/PDSCH) (M number)+MULTICAST (/BRAODCAST) DATA (/PDSCH) (N number)}') may be regarded or the ACK/NACK size may be determined on the assumption that there is no 'MULTICAST (/BRAODCAST) DATA (/PDSCH)' scheduling. For example, (Rule #1-2) may be applied to (all) of the cases where ACK/NACK information is transmitted through the 'PUCCH' (e.g., PUCCH FALLBACK CASE (in which ACK/NACK information is transmitted by 'PF1A/1B', rather than 'PF3') may be excluded) and/or 'PUSCH piggy back'.

(Rule #1-3)

In case where the scheduling presence or absence (/number) information related to 'MULTICAST (/BRAODCAST) DATA (/PDSCH)' is not signaled through 'UNICAST UL GRANT (U_UL GRANT)', an (overall) payload may be configured (A) to have an ACK/NACK size designated (/determined) by UL DAI for 'UNICAST DATA (/PDSCH)' and (B) to have a maximum ACK/NACK size for the 'MULTICAST (/BRAODCAST) DATA (/PDSCH)' to perform piggyback.

(Rule #1-4)

When scheduling presence or absence (/number) information related to 'MULTICAST (/BRAODCAST) DATA (/PDSCH)' is signaled through 'UNICAST UL GRANT', an (overall) payload may be configured (A) to have an ACK/NACK size designated (/determined) by the UL DAI for the 'UNICAST DATA (/PDSCH)' and (B) to have an ACK/

NACK size (e.g., 'ZERO', 'NON-ZERO') according to scheduling presence or absence (/number) information related to 'MULTICAST (/BRAODCAST) DATA (/PDSCH)' (on 'U_DL GRANT') for the 'MULTICAST (/BRAODCAST) DATA (/PDSCH)' to perform piggyback.

[Proposed Method #2]

For example, '(DL) DAI' on 'U_DL GRANT' may be set to count to include 'MULTICAST (/BRAODCAST) DATA (/PDSCH)', as well as 'UNICAST DATA (/PDSCH)'. Here, in an example of a case in which the corresponding rule is applied, in case where 'UNICAST DATA (/PDSCH) BUNDLING WINDOW SIZE' is '4' and 'UNICAST DATA (/PDSCH) TX', 'NO PDSCH TX, 'MULTICAST (/BRAODCAST) DATA (/PDSCH) TX', and 'UNICAST DATA (/PDSCH) TX' are performed on 'SF # N', 'SF # (N+1)', 'SF # (N+2)', 'SF # (N+3)', respectively, the '(DL) DAI' value on the 'U_DL GRANT' is set to '3' (i.e., obtained by counting UNICAST DATA (/PDSCH)' of 'SF # N, MULTICAST (/BRAODCAST) DATA (/PDSCH)' of 'SF # (N+2), and UNICAST DATA (/PDSCH)' of 'SF # (N+3)). Accordingly, for example, the V2X UE(s) may recognize how many 'MULTICAST (/BRAODCAST) DATA (/PDSCH)' has been transmitted (attempted) to V2X UE(s) between 'UNICAST DATA (/PDSCH) of SF # N' and 'UNICAST DATA (/PDSCH) of SF # (N+3)'.

[Proposed Method #3]

In an example, in order to allow the V2X UE(s) to recognize the number of 'MULTICAST (/BRAODCAST) DATA (/PDSCH)' transmitted (attempted) to the V2X UE(s) (within 'UNICAST DATA (/PDSCH) BUNDLING WINDOW'), 'UNICAST DATA (/PDSCH)-related (DL) DAI (U-DAI)' field and 'MULTICAST (/BRAODCAST) DATA (/PDSCH)-related (DL) DAI (M-DAI)' may be defined on (all the) DL GRANT(s) (e.g., on 'U_DL GRANT' and/or 'MULTICAST (/BRAODCAST) DL GRANT (M_DL GRANT)'). Here, in an example, 'U-DAI' and 'M-DAI' values are obtained by counting 'UNICAST DATA (/PDSCH)' and 'MULTICAST (/BRAODCAST) DATA (/PDSCH)', respectively. In an additional example, (A) a 'U-DAI' field for counting 'UNICAST DATA (/PDSCH)' and (B) a 'DAI (TOTAL-DAI)' field for counting all the 'MULTICAST (/BRAODCAST) DATA (/PDSCH)' and 'UNICAST DATA (/PDSCH)' may be defined on (all the) DL GRANT(s) (e.g., 'U_DL GRANT' and/or 'M_DL GRANT'). Here, for example, the V2X UE(s) regard a value obtained by subtracting the 'U-DAI' value from the 'TOTAL-DAI' value as the number of 'MULTICAST (/BRAODCAST) DATA (/PDSCH)' transmitted (attempted) to the V2X UE(s) itself.

[Proposed Method #4]

For example, 'MCS OFFSET (BETA_OFFSET) values' to be respectively applied to (/used in) a case where ACK/NACK information including data (/control information) required to have relatively high reliability (e.g., 'M_ACK/NACK information' (or 'U_ACK/NACK information')) is 'PUSCH-piggybacked' or to otherwise case may be differently set (/signaled).

Here, the BETA OFFSET affects the number of resource elements (REs) used for uplink control information (UCI) piggyback. For example, if the beta offset is large, the number of REs used by the terminal for UCI piggyback is increased, and if the beta offset is small, the number of REs used by the terminal for UCI piggyback is reduced. Here, if the beta offset is increased, a coding rate is lowered (because the number of REs used for UCI piggyback is increased but the number of REs used for data is reduced instead and reliability may be increased.

Here, in a specific example, when ACK/NACK information including data (/control information) required to have relatively high reliability is 'PUSCH piggybacked', a relatively high 'BETA_OFFSET value' is applied (/used) (i.e., the 'coding rate' may be lowered by increasing the number of REs used in the UCI TX), and in otherwise case, a relatively low BETA_OFFSET value is applied (/used). In an additional example, an 'ACK/NACK PAYLOAD SIZE' value may be set (/signaled) differently in the case of a 'PUCCH' in which ACK/NACK information including data (/control information) required to have relatively high reliability (e.g., 'M_ACK/NACK information' (or 'U_ACK/NACK information')) is transmitted and in otherwise case. Here, in a specific example, in the case of the 'PUCCH' in which the ACK/NACK information including data (/control information) required to have relatively high reliability is transmitted, a relatively small payload of 'N BIT(s)' is configured (i.e., 'CODING RATE' may be lowered by reducing the amount of payload (transmitted through resource having the same size), and in otherwise case, a relatively large payload of 'M BIT(s) (e.g., 'M>N') is configured.

In another example, transmission power of related ACK/NACK information (parameter (e.g., P_O alpha) (e.g., the term of 'transmission power' may be interpreted as 'PUCCH (/PUSCH) transmission power' in which (related) ACK/NACK information is transmitted (/piggybacked)) may be differently (or independently) set (/signaled) according to 'traffic (/data/service) type' (and/or '(target) reliability (/QoS/latency) requirement'). Here, for example, traffic (/data/service)-related ACK/NACK information of relatively high '(target) reliability (/QoS) requirement' (and/or relatively short '(target) latency requirement') is transmitted with (relatively) high (or low) power, and traffic (/data/service)-related ACK/NACK information of relatively low '(target) reliability (/QoS) requirement' (and/or relatively long '(target) latency requirement') is transmitted with (relatively) low (or high) power. Here, for example, in case where different (or independent) ACK/NACK information transmission power (parameter) is set (/signaled) for each 'traffic (/data/service) type' (and/or '(target) reliability (/QoS/latency) requirement'), 'orthogonal (/separate) ACK/NACK resource(s)' may be set (/signaled) in consideration of mutual interference (/and/or 'in-band emission'). Here, for example, a specific (serving) cell (/BS) may provide information regarding a (time/frequency) resource region in which ACK/NACK information of relatively high (and/or low) (transmission) power (parameter) is transmitted to an adjacent cell (/BS). Here, for example, the adjacent cell (/BS), which receives the corresponding information, may perform control that transmission of traffic (/data/service)-related) ACK/NACK information of (relatively high (or low) '(target) reliability (/QoS) requirement (and/or relatively short (or long) '(target) latency requirement') is not scheduled (/set) on the (corresponding) resource region predicted (/estimated) to have high interference. In another example, 'DTX detection (error) reference (/threshold value)' (and/or 'NACK-to-ACK error reference (/threshold value)' and/or 'ACK-to-NACK error reference (/threshold value)') may be set (/signaled) differently (or independently) according to 'traffic (/data/service) type' (and/or '(target) reliability (/QoS/latency) requirement'). Here, for example, traffic (/data/service)-related 'DTX detection (error) reference (/threshold value)' (and/or 'NACK-to-ACK error reference (/threshold value)' and/or 'ACK-to-NACK error reference (/threshold value)' of relatively high '(target) reliability (/QoS) requirement' (and/or relatively short '(target) latency requirement') is set (/signaled) to a (relatively) low (or high) value, and traffic (/data/service)-related ('DTX detection (error) reference (/threshold value)' (and/or 'NACK-to-ACK error reference (/threshold value)' of relatively low '(target) reliability (/QoS) requirement' (and/or relatively long '(target) latency requirement') may be set (/signaled0 to (relatively) high (or low) value.

[Proposed Method #5]

For example, in case where 'M_ACK/NACK information (and/or 'U_ACK/NACK information') is 'PUSCH piggybacked', it may be configured to use (predefined (signaled) 'UE-specific feedback resource(s)' (or 'UE-specific) scheduled PUSCH (piggyback) resource (s)'), or in otherwise case, it may be configured to set ('predefined (/signaled) 'cell-specific feedback resource(s)' (or 'UE (/cell) group-specific feedback resource(s)' or UE-common feedback resource(s)'). Here, for example, 'feedback resource(s)' may be interpreted as (predefined (/signaled) 'PUCCH resource(s)' and/or 'PUSCH resource(s)' and/or 'PRACH (preamble) resource(s)' and/or 'SR resource(s)', and the like.

In another example, in case where a transmission time of 'M_ACK/NACK information' and a transmission time of 'U_ACK/NACK information' overlap in a time domain, transmission of the 'ACK/NACK information' having a relatively low priority may be omitted according to a predefined (/signaled) priority rule. Here, for example, priority related to 'transmission of M_ACK/NACK information' (or transmission of 'U_ACK/NACK information) may be set (/signaled) to be relatively low (or high). When such a rule is applied, for example, (data) performance may be reduced due to 'ACK/NACK information' which is omitted from transmission.

Here, for example, in order to decrease the corresponding reduction in (data) performance, in case where the transmission time of 'ACK/NACK information' (L_ACK/NACK information) having a relatively low priority overlaps the transmission time of 'ACK/NACK information (H_ACK/NACK information) having a (relatively) high priority (in the time domain), it may be configured such that the transmission time of 'ACK/NACK information' is shifted (according to predefined (signaled) rule). Here, for example, the following proposed methods propose a method for effectively performing a corresponding 'ACK/NACK TX timing shifting' operation.

[Proposed Method #6]

For example, it may be configured such that, (in an environment of a TDD (/FDD) system), (A) only when 'L_ACK/NACK information transmission time' and 'H_ACK/NACK information transmission time' overlap (in the time domain), 'L_ACK/NACK information transmission time' follows predefined (/signaled) 'TDD UL-DL configuration (DL HARQ reference configuration)-related 'DL HARQ timeline (or 'ACK/NACK TX timeline), or (B) the 'L_ACK/NACK information transmission time' follows predefined (/signaled) 'DL HARQ reference configuration)-related 'DL HARQ timeline' (or 'ACK/NACK TX timeline'), regardless of whether 'L_ACK/NACK information transmission time' and 'H_ACK/NACK information transmission time' overlap (in the time domain).

Here, if the terminal fails to transmit the ACK/NACK information having low priority by shifting the transmission time of ACK/NACK (e.g., L_ACK/NACK) information having low priority, the terminal may discard (or drop) transmission of the ACK/NACK information having low priority.

Here, for example, in the case of the TDD system, the 'DL HARQ reference configuration' may be defined to include all 'DL SF SETs' on (at least) 'SIB (SYSTEM INFORMATION BLOCK) TDD UL-DL CONFIGURATION' and/or not to include 'UL SF SET' in which predefined (/signaled) 'H_ACK/NACK information' is transmitted. Here, for example, in the 'UL SF SET' on the 'DL HARQ REFERENCE CONFIGURATION' (for the purpose of 'L_ACK/NACK information transmission'), 'H_ACK/NACK information transmission' may be omitted (A) when 'H_ACK/NACK information transmission' is not generated (or when a probability that 'H_ACK/NACK information transmission' is performed is (relatively) low) and/or (B) when 'H_ACK/NACK information transmission' and 'L_ACK/NACK information transmission' overlap (in the time domain). Here, for example, the 'H_ACK/NACK information transmission time' may be set to follow 'SIB TDD UL-DL CONFIGURATION'-related 'DL HARQ TIMELINE' (or 'ACK/NACK TX TIMELINE') (or set to follow additionally defined (/signaled) 'DL HARQ REFERENCE CONFIGURATION'-related 'DL HARQ TIMELINE' (or 'ACK/NACK TX TIMELINE') (for the purpose of 'H_ACK/NACK information transmission').

For example, in the TDD system, when 'DL HARQ REFERENCE CONFIGURATION' is set (/signaled), 'L_ACK/NACK information configuration/transmission' may be performed according to (some of) the following rules. Hereinafter, for the purposes of description, it is assumed that 'UL SF # K' belongs to 'UL SF SET' on 'DL HARQ reference configuration'.

(Rule #6-1)

A '(maximum) L_ACK/NACK payload size' (and/or DATA (/PDSCH) (L_DATA/PDSCH)) having relatively low priority (maximum bundling window size') that may be transmitted in a 'UL SF # K' may be obtained by counting only 'DL SF(s)' (/'special SF') (equally) even on 'SIB TDD UL-DL configuration' in a'DL SF(S)' (/'SPECIAL SF') interworking with 'DL HARQ reference configuration'-based 'UL SF # K' or counting (every) 'DL SF(s)' (/'SPECIAL SF') interworking with 'DL HARQ reference configuration'-based 'UL SF # K'.

(Rule #6-2)

(When Rule #6-1 is applied) (A) 'PUCCH RESOURCE STACKING (/RESERVATION) operation' and/or (B) 'L_ACK/NACK BIT ORDERING OPERATION' RELATED TO 'L_ACK/NACK information', which may be transmitted in the 'UL SF # K', may be performed according to (some of) the following rules.

Here, a case where SIB TDD UL_DL CONFIGURATION and DL HARQ REFERENCE CONFIGURATION are different occurs, and here, for example, for the purposes of description, during 'DL SF(s)' (/'SPECIAL SF') interworking with 'UL SF # K' based on 'DL HARQ REFERENCE CONFIGURATION', (A) 'DL SFs' (/'SPECIAL SFs') which are the same 'DL SF' (/'SPECIAL SF') and (simultaneously) have the same 'DL HARQ TIMELINE' (or 'ACK/NACK TX TIMELINE') on the 'SIB TDD UL-DL CONFIGURATION' and 'DL HARQ REFERENCE CONFIGURATION' may be termed 'SF_TYPE #1', (B) 'DL SFs' (/'SPECIAL SFs') which are the same 'DL SF' (/'SPECIAL SF') and (simultaneously) have different 'DL HARQ TIMELINE' (or 'ACK/NACK TX TIMELINE') on the 'SIB TDD UL-DL CONFIGURATION' and 'DL HARQ REFERENCE CONFIGURATION' may be termed 'SF_TYPE #2', and (C) 'SFs' which are 'UL SF' and 'DL SF', respectively, on the 'SIB TDD UL-DL CONFIGURATION' and 'DL HARQ REFERENCE CONFIGURATION' may be termed 'SF_TYPE #3'.

When the subframe types may be classified as SF_TYPE #1, SF_TYPE #2, and SF_TYPE #3, regarding which of the SF_TYPEs ACK/NACK is to be preferentially reserved may be a problem.

Here, since SF_TYPE #1 is the same 'DL SF' (/SPECIAL SF') and (simultaneously) has the same 'DL HARQ TIMELINE' (or 'ACK/NACK TX TIMELINE') on the 'SIB TDD UL-DL CONFIGURATION' and 'DL HARQ REFERENCE CONFIGURATION', it has a high probability of being used all the time in terms of PUCCH resource. Thus, it may be preferable to preferentially reserve ACK/NACK information regarding the SF_TYPE #1 and a specific example thereof will be described in the following examples.

(Example #6-2-1)

After to 'SF_TYPE #1 L_ACK/NACK information'-related 'PUCCH RESOURCE' is preferentially 'STACKED (/RESERVED)', 'SF_TYPE #2 L_ACK/NACK information'-related 'PUCCH RESOURCE' is 'STACKED (/RESERVED)'. Here, for example, it may be interpreted that, when such a rule is applied, 'SF_TYPE #3 L_ACK/NACK information'-related 'PUCCH RESOURCE' is not 'STACKED (/RESERVED)'. Here, for example, by applying predefined (/signaled) 'PUCCH RESOURCE OFFSET value' to a start point of 'SF_TYPE #2 PUCCH RESOURCE REGION', it may be separated from 'SF_TYPE #1 PUCCH RESOURCE REGION'.

In another example, after the 'SF_TYPE #1 L_ACK/NACK information'-related 'PUCCH RESOURCE' is preferentially 'STACKED (/RESERVED)', 'SF_TYPE #2/3 L_ACK/NACK information'-related 'PUCCH RESOURCE' is STACKED (/RESERVED)' (e.g., 'SF_TYPE #2/3' share the common 'PUCCH RESOURCE REGION' and 'BLOCK INTERLEAVING' may be applied to the SF_TYPE #2/3'. Here, for example, by applying predefined (/signaled) 'PUCCH RESOURCE OFFSET value' to a starting point of 'SF_TYPE #2/3 PUCCH RESOURCE REGION', it may be separated from 'SF_TYPE #1 PUCCH RESOURCE REGION'.

(Example #6-2-2)

'SF INDEX' (or '(DL) DAI') (ascending order (or descending order)) (or 'DL HARQ REFERENCE CONFIGURATION'-related 'DL HARQ TIMELINE order' (or 'ACK/NACK TX TIMELINE order'))-based 'L_ACK/NACK BIT ORDERING' operation is performed.

In the existing FDD system, 'DL HARQ TIMELINE' (or 'ACK/NACK TX TIMELINE') may be, for example, 'SF # (P+4)'. In addition, in the existing FDD system, the DAI (Downlink Assignment Index) is not separately set. However, hereinafter, a method of performing 'L_ACK/NACK information configuration/transmission' at a new point of time, instead of performing 'L_ACK/NACK information configuration/transmission' at the SF # (P+4) as in the existing FDD system, is proposed. Also, hereinafter, a method of separately setting a DAI in the FDD system is also provided.

For example, when 'DL HARQ reference configuration' is set (/signaled) in the FDD system, 'L_ACK/NACK information configuration/transmission' may be performed according to (some of) the following rules.

(Rule #6-3)

In order to avoid scheduling restriction of 'L_DATA (/PDSCH)' in 'DL SF # P' corresponding to 'UL SF # K' position on 'DL HARQ reference configuration' the 'L_DATA (/PDSCH)'-related 'L_ACK/NACK information' received in the corresponding DL SF # P may exceptionally be set to follow the 'DL HARQ TIMELINE' (or 'ACK/NACK TX TIMELINE') (e.g., 'SF # (P+4)') (or set to follow predefined (/signaled) additional 'DL HARQ TIMELINE' (or 'ACK/NACK TX TIMELINE')), (rather than ('DL HARQ REFERENCE CONFIGURATION'-related 'DL HARQ TIMELINE' (or 'ACK/NACK TX TIMELINE')). Here, for example, on the 'L_DATA (/PDSCH)' scheduling-related 'DL GRANT' in the 'DL SF # P', (A) 'DL DAI field (information)' (See 'Rule #6-4', for example) may be exceptionally omitted or (B) may be set to a predefined (/signaled) specific value (e.g., '0') (e.g., which may be utilized as 'VIRTUAL CRC').

(Rule #6-4)

It may be configured such that, when 'DL HARQ REFERENCE CONFIGURATION' is set (/signaled), a 'DL DAI field' is present on the ('L_DATA (/PDSCH' scheduling related) 'DL GRANT' transmitted on USS (UE-SPECIFIC SEARCH SPACE) and 'DL DAI field' is not present on the ('L_DATA (/PDSCH)' scheduling related) 'DL GRANT' transmitted on the CSS (unlike the case of the existing FDD system). Also, in another example, it may be configured such that, when 'DL HARQ REFERENCE CONFIGURATION' is set (/signaled), 'DL DAI field' is present on the ('L_DATA (/PDSCH)' scheduling related) 'DL GRANT' transmitted on the USS and the ('L_DATA (/PDSCH)' scheduling related) 'DL GRANT' transmitted on the CSS (unlike the case of the existing FDD system).

(Rule #6-5)

When 'DL HARQ REFERENCE CONFIGURATION' is set (/signaled), an 'L_ACK/NACK BIT ORDERING' operation may be performed on the basis of 'SF INDEX' (or '(DL) DAI' (ascending order (or descending order) (or 'DL HARQ REFERENCE CONFIGURATION'-related 'DL HARQ TIMELINE order' (or 'ACK/NACK TX TIMELINE order')).

[Proposed Method #7]

For example, it may be configured such that, (in an environment of the FDD (/TDD) system), (A) only when 'L_ACK/NACK information transmission time' and 'H_ACK/NACK information transmission time' overlap (in the time domain), 'L_ACK/NACK information transmission' is performed through the closest 'VALID UL SF' after (/including) the corresponding time or (B) 'L_ACK/NACK information transmission' is always performed through the closest 'VALID UL SF' after (/including) the corresponding time, regardless of whether L ACK/NACK information transmission time' and 'H ACK/NACK information transmission time' overlap (in the time domain). Here, for example, 'VALID UL SF' may be defined as a 'UL SF' which does not belong to 'UL SF SET' in which (all the) 'UL SF' or predefined (/signaled) 'H_ACK/NACK information' is transmitted or as a 'UL SF' which belongs to a 'UL SF SET' in which predefined (/signaled) 'L_ACK/NACK information' is transmitted. Here, for example, in the 'UL SF SET' in which the predefined (/signaled) 'L_ACK/NACK information' is transmitted, 'H_ACK/NACK information transmission' may be omitted when (A) 'H_ACK/NACK information transmission' does not occur (or a probability that 'H_ACK/NACK information transmission' is performed is (relatively) low) and/or (B) 'H_ACK/NACK information transmission' and 'L_ACK/NACK information transmission' overlap (in the time domain). Here, for example, 'H_ACK/NACK information transmission' may be set to follow the 'DL HARQ TIMELINE' (or 'ACK/NACK TX TIMELINE') of the existing FDD system or may be set to be performed through 'UL SF SET' in which the predefined (/signaled) 'H_ACK/NACK information' is transmitted (for example, 'H_ACK/NACK information transmission' may be performed (through 'UL SF SET' in which (predefined (/signaled) 'H_ACK/NACK information' is transmitted) closest after (including) time determined according to 'DL HARQ TIMELINE' (or 'ACK/NACK TX TIMELINE') of the existing FDD system. Here, if a plurality of pieces of 'L_ACK/NACK information' (and/or 'H_ACK/NACK information') must be reported by applying the above methods, a predefined (/signaled) 'subframe bundling technique' (or 'codeword bundling technique') may be applied (for example, the 'bundling' operation refers to application of 'LOGICAL AND operation' to 'ACK/NACK response' corresponding to a plurality of subframes (/codewords) within a given 'BUNDLING WINDOW'). For example, in case where the above methods are applied in the FDD system, 'ACK/NACK information configuration/transmission' may be performed according to (some of) the following rules.

(Rule #7-1)

It may be configured such that if 'DATA (/PDSCH)' (and/or related 'DL GRANT') is not received on a last DL SF (in SF time order) among DL SF(s) corresponding to 'BUNDLING WINDOW', 'DATA (/PDSCH)' reception-related 'ACK/NACK information' in the corresponding 'BUNDLING WINDOW' is not (finally) transmitted. Here, for example, the reason for applying such a rule is because, if the 'DATA (/PDSCH)' (and/or related 'DL GRANT') fails to receive on the last DL SF within the 'BUNDLING WINDOW', the corresponding 'BUNDLING WINDOW-related 'PUCCH RESOURCE' cannot be determined.

[Proposed Method #8]

For example, (in the FDD system environment) if 'ACK/NACK information' for 'DATA (/PDSCH)' received on 'DL SF # (N-K1)' and 'DL SF # (N-K2)' is transmitted through 'UL SF # N', (A) 'PUCCH RESOURCE STACKING (/RESERVATION) operation' and/or (B) 'L_ACK/NACK BIT ORDERING operation' may be performed according to (some of) the following rules. Here, a relationship of 'K2>K1' is established and, for the purposes of description, it is assumed that 'K2=5' and 'K1=4' hereinafter.

(Rule #8-1)

After 'DL SF # (N-K1)'-related 'PUCCH RESOURCE' is preferentially 'STACKED (/RESERVED), 'DL SF # (N-K2)'-related 'PUCCH RESOURCE' is stacked (/reserved). Herein, for example, when such a rule is applied, (A) 'DL SF # (N-K1)'-related 'PUCCH RESOURCE' and (B) LEGACY UE(s)-related 'PUCCH RESOURCE' may be effectively multiplexed on 'UL SF # N'. Here, for example, by applying predefined (/signaled) 'PUCCH RESOURCE OFFSET value' to a start point of 'DL SF # (N-K2)-related PUCCH RESOURCE REGION', it may be separated from the 'DL SF # (N-K1)-related PUCCH RESOURCE REGION'. In another example, after 'DL SF # (N-K2)'-related 'PUCCH RESOURCE' is preferentially 'stacked (/reserved)', 'DL SF # (N-K1)'-related 'PUCCH RESOURCE' may be stacked (/reserved).

(Rule #8-2)

'SF INDEX' (or '(DL) DAI') (ascending order (or descending order))-based 'L_ACK/NACK BIT ORDERING' operation is performed.

(Rule #8-3)

It may be configured such that, when 'ACK/NACK information' for 'DATA (/PDSCH)' received on 'DL SF # (N-K1)' and 'DL SF # (N-K1)' is 'PUSCH piggybacked' (UL SF # N), 'related ACK/NACK information' is 'PACKED' (/STACKED) (or transmitted) in order of 'DL SF # (N-K2)→DL SF # (N-K1)'.

In another example, (in view of a specific V2X UE), (A) whether to perform 'PUSCH piggyback' and/or whether to perform 'PUCCH-based transmission' may be differently applied according to type (/priority) when (A) (a plurality of pieces) (predefined (/signaled) 'ACK/NACK information' of different types (e.g., 'M_ACK/NACK information', 'U_ACK/NACK information') transmissions and (B) PUSCH transmission overlap (in the time domain). Here, for example, the corresponding rule may limitedly applied only to the case of V2X UE(s) having 'a capability of 'simultaneously transmitting 'PUCCH' and 'PUSCH' and/or only to the case of V2X UE(s) in which a (new) operation mode is set (/signaled) from a (serving) BS (or network).

[Proposed Method #9]

The M_ACK/NACK information may be transmitted through 'PUCCH' (according to (some of) the 'PUCCH RESOURCE' determination methods described above) and the 'U_ACK/NACK information may be 'PUSCH piggybacked' (according to (some of) the 'PUSCH piggyback; methods described above). Here, for example, the 'M_ACK/NACK information' may also be transmitted through (predefined (/signaled) 'CELL-SPECIFIC FEEDBACK RESOURCE(S)' (or 'UE (/CELL) GROUP-SPECIFIC FEEDBACK RESOURCE(S)' or 'UE-COMMON FEEDBACK RESOURCE(S)' (or UE-SPECIFIC FEEDBACK RESOURCE(S)')). Here, for example, the application of such a rule may be interpreted that 'M_ACK/NACK information' ('U_ACK/NACK information') has a relatively higher priority than 'U_ACK/NACK information' (or M_ACK/NACK information').

Here, for example, when transmission power is distributed between the 'PUSCH' (U_PUSCH) in which 'U_ACK/NACK information' is piggybacked and transmitted and the 'PUCCH' (M_PUCCH) in which 'M_ACK/NACK information' is transmitted, the U_PUSCH' (or M_PUCCH') may have a higher priority than the 'M_PUCCH' (or 'U_PUSCH) (in terms of transmission power allocation). Here, for example, (predefined (/signaled) different 'BETA_OFFSET values' may be applied to a case (A) where (the V2X UE(s) having a 'capability of simultaneously transmitting PUCCH and PUSCH) 'PUSCH piggybacks' 'U_ACK/NACK information' because 'M ACK/NACK information transmission', 'U_ACK/NACK information transmission', and 'PSUCH transmission' overlap (in the time domain) and a case (B) where (the V2X UE(s) having a 'capability of simultaneously transmitting PUCCH and PUSCH) 'PUSCH piggybacks' 'U_ACK/NACK information' because 'U_ACK/NACK information transmission' and 'PSUCH transmission' overlap (in the time domain). Here, in a specific example, in the former ('(A)') case (compared with the latter ('(B)') case (or in the latter ('(B)') case (compared with the former ('(A)') case, a relatively high 'BETA_OFFSET value' may be applied (/used) (that is, 'CODING RATE' may be lowered by increasing the 'RE number' used for (PIGGYBACKED) UCI TX'. In another example, the 'U_ACK/NACK information' may be transmitted through the 'PUCCH' (according to (some of) the 'PUCCH RESOURCE' determining methods described above) and the 'M_ACK/NACK information' may be 'PUSCH piggybacked' (according to (some of) the PUSCH piggyback' methods described above) and transmitted. Here, for example, (some of) the methods (in case where the 'M_ACK/NACK information' is transmitted through the 'PUCCH' and the U_ACK/NACK information' is 'PUCCH piggybacked' and transmitted may also be applied similarly.

In another example, 'M_ACK/NACK information' (and/or 'U_ACK/NACK information') may be transmitted through (predefined (/signaled) different 'PUCCH RESOURCE(S)' according to whether the V2X UE(s) are in an 'RRC_CONNECTED MODE' or in an 'RRC_IDLE MODE' (here, the multicast message may be a PS (PUBLIC SAFETY) MESSAGE, the terminal may need to be able to receive the multicast message even in the RRC idle mode).

Here, in a specific example, the V2X UE (S) in the 'RRC_CONNECTED MODE' may transmit 'UE-SPECIFIC FEEDBACK RESOURCE(S)' (or 'M_ACK/NACK information' (and/or 'U_ACK/NACK information') through (UE-SPECIFIC) SCHEDULED PUSCH (PIGGYBACK) RESOURCE(S)'), and the V2X UE(S) in the 'RRC_IDLE MODE' may transmit 'UE-SPECIFIC FEEDBACK RESOURCE(S)' (or 'M_ACK/NACK information' (and/or 'U_ACK/NACK information') through 'CELL-SPECIFIC FEEDBACK RESOURCE(S)' (or 'UE (/CELL) GROUP-SPECIFIC FEEDBACK RESOURCE(S)' or 'UE-COMMON FEEDBACK RESOURCE(S)'). In another example, regardless of state of the V2X UE(s) (e.g., whether the V2X UE(s) are in the "RRC_CONNECTED MODE' or in the 'RRC_IDLE MODE'), the 'M_ACK/NACK information' (and/or 'U_ACK/NACK information') may be transmitted through (predefined (/signaled) CELL-SPECIFIC FEEDBACK RESOURCE(S)' (or 'UE (/CELL) GROUP-SPECIFIC FEEDBACK RESOURCE(S)' or 'UE-COMMON FEEDBACK RESOURCE(S)') (or 'UE-SPECIFIC FEEDBACK RESOURCE(S)' (or '(UE-SPECIFIC) SCHEDULED PUSCH (PIGGYBACK) RESOURCE(S)')).

In another example, transmissions of (a plurality of pieces of) (predefined (/signaled) 'ACK/NACK information' (e.g., "M_ACK/NACK information', 'U_ACK/NACK information') having different types (/priorities) are (simultaneously) 'PUSCH piggybacked' (in (some of) the proposed rules), the 'U_ACK/NACK information' may be 'PUSCH piggybacked' according to the existing (LTE) method (e.g., preferentially mapped ('PUSCH DATA' is punctured and 'ACK/NACK information' is mapped) and the 'M_ACK/NACK information' may be 'PUSCH piggybacked' according to a predefined (/signaled) (different) method (e.g., according to 'RM (RATE-MATCHING)' (or in the same manner as that of the case of the 'U_ACK/NACK information'). Here, for example, in case where ('M_ACK/NACK information' (and/or 'U_ACK/NACK information')) is 'PUSCH piggybacked' in a 'puncturing method', it may be implemented in an 'ON-OFF KEYING' form (e.g., in a form in which only energy (rather than bit information) is transmitted).

It is obvious that the examples of the proposed methods described above may also be included as one of implementation methods of the present invention and thus regarded as proposed methods. In addition, the aforementioned proposed methods may be independently implemented or some proposed methods may be combined or merged. Although the present invention has been described based on the 3GPP LTE system for the purposes of description, the scope of the system to which the proposed method is applied may extend to other systems in addition to the 3GPP LTE system. The proposed methods of the present invention may also extend for D2D communication. D2D communication refers to that a UE communicates directly with another UE using a wireless channel. Herein, for example, D2D communication means that a UE communicates directly with another UE using a wireless channel. Here, for example, a UE refers to a user UE, but in case where network equipment such as a base station transmits/receives a signal according to a communication method between UEs, the network equipment may also be regarded as a UE. In addition, for example, the proposed methods of the present invention may be applied only to 'TDD system' (and/or 'FDD system'). Also, for example, the proposed methods of the present invention may be applied only to the MODE 2 V2X operation (and/or the MODE 1 V2X operation). In addition, for example, the proposed methods of the present invention may be limitedly applied only to a case where the 'M_ACK/NACK information' (and/or 'U_ACK/NACK information') is transmitted through (predefined (/signaled) 'CELL-SPECIFIC FEEDBACK RESOURCE(S)' (or 'UE (/CELL) GROUP-SPECIFIC FEEDBACK RESOURCE(S)' or 'UE-COMMON FEEDBACK RESOURCE(S)' or 'UE-SPECIFIC FEEDBACK RESOURCE(S)' or '(UE-SPECIFIC) SCHEDULED PUSCH (PIGGYBACK) RESOURCE(S)'). In addition, for example, the proposed methods of the present invention may be limitedly applied only to a case where 'PF3' is set (and/or a case where the 'number of cells set according to a carrier aggregation technique is greater than or equal to '2', and/or a case where '(ACK/NACK) BUNDLING WINDOW SIZE' is greater than '2', and/or a case where 'PF1B WITH CHANNEL SELECTION' is set, and/or a case of 'SINGLE CELL', and/or a case where 'two' cells are set according to the carrier aggregation technique, and/or a case where '(ACK/NACK) BUNDLING WINDOW SIZE' is smaller than '2'.

As described above, the UE may transmit ACK/NACK for unicast data and multicast data. Hereinafter, an example in which the UE transmits ACK/NACK for unicast data and multicast data described above with reference to FIG. 14 will be described from viewpoints of an example in which 1. The UE transmits ACK/NACK for multicast data and unicast data on the basis of an ACK payload determined by the UE, an example in which 2. The UE sets different parameter (e.g., alpha offset) or beta offset) values regarding each ACK/NACK for unicast data and multicast data on the basis of reliability required for the unicast data and multicast data and transmits ACK/NACK, and an example in which 3. A transmission time of ACK/NACK information having a low priority is shifted (or dropped) on the basis of priority.

Here, for the purposes of description, each example is separately described, but as described above, the examples described later (or earlier) may be operated individually or in combination.

1. An Example in which ACK/NACK for Multicast Data and Unicast Data is Transmitted Based on an ACK/NACK Payload Determined by the UE FIG. 15 is a flowchart illustrating a method of transmitting ACK/NACK for unicast data and multicast data by a V2X UE according to another embodiment of the present invention.

Figure 15:
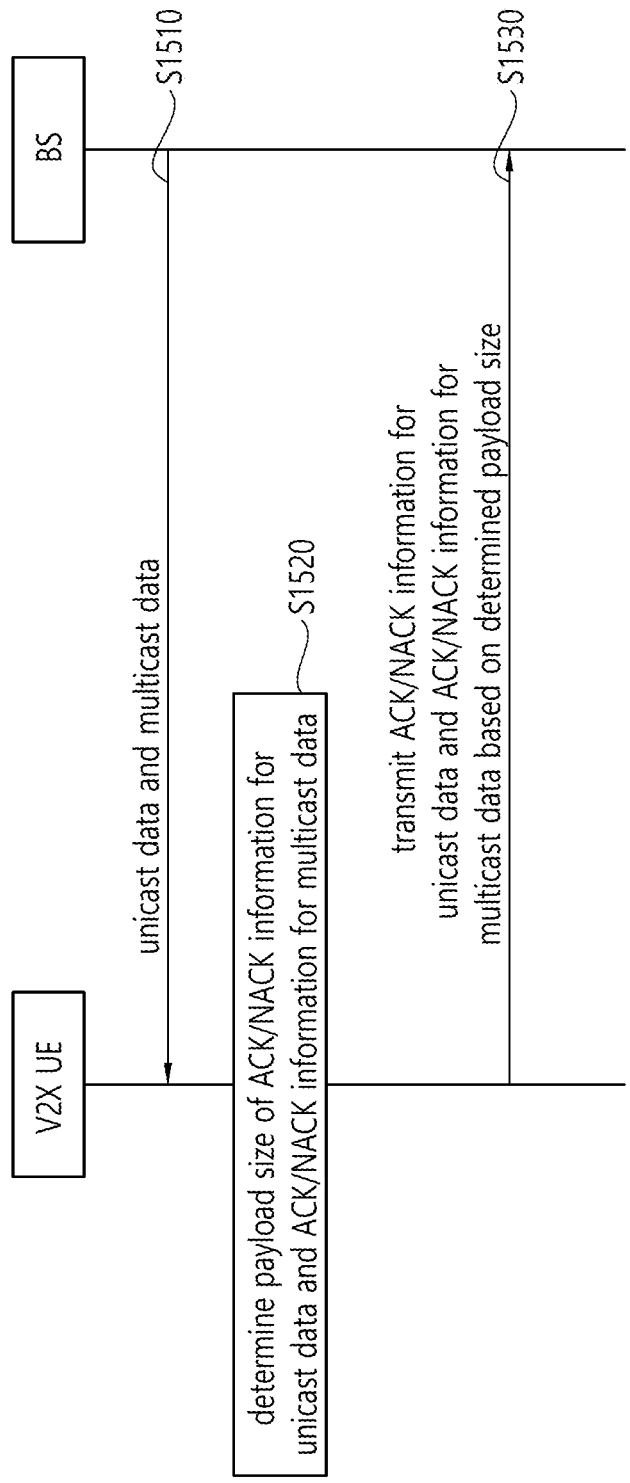
FIG. 15 is a flowchart illustrating a method of transmitting ACK/NACK for unicast data and multicast data by a V2X UE according to another embodiment of the present invention.

According to FIG. 15, the UE may receive unicast data and multicast data (S1510). Here, the terminal UE may be a V2X UE, and a specific example in which the UE receives unicast data and multicast data is as described above.

Thereafter, the UE may determine a payload size of each of ACK/NACK information for the unicast data and ACK/NACK information for the multicast data (S1520). For example, the V2X UE may transmit ACK/NACK for the unicast data and ACK/NACK for the multicast data according to a payload size determined based on whether only the unicast data has been received or whether both the unicast data and the multicast data are simultaneously received. Here, the V2X UE may transmit ACK/NACK for the unicast data and ACK/NACK for the multicast data according to the payload size determined based on whether scheduling information regarding the multicast data has been received by the V2X UE.

That is, as described above, for a case (A) where only 'UNICAST DATA (/PDSCH)' is received and for a case (B) where 'UNICAST DATA (/PDSCH)' and 'MULTICAST (/BRAODCAST) DATA (/PDSCH)' are simultaneously received, (PUCCH FORMAT 3 (PF3)) payloads having different sizes may be configured.

In case where scheduling presence or absence (/number) information related to 'MULTICAST (/BRAODCAST) DATA (/PDSCH)' is not signaled through 'UNICAST DL GRANT (U_DL GRANT)', if 'ANY DATA (/PDSCH)' is received, the (overall) payload is always configured to have a maximum ACK/NACK size of '{UNICAST DATA (/PDSCH) (M number)+MULTICAST (/BRAODCAST) DATA (/PDSCH) (N number)}' and transmitted, regardless of differentiation between 'UNICAST DATA (/PDSCH)' and 'MULTICAST (/BRAODCAST) DATA (/PDSCH)'.

Also, in case where scheduling presence or absence (/number) information related to 'MULTICAST (/BRAODCAST) DATA (/PDSCH)' is signaled through 'UNICAST DL GRANT (U_DL GRANT)', (A) if only 'MULTICAST (/BRAODCAST) DATA (/PDSCH)' is received, an (overall) payload is configured to have a maximum ACK/NACK size of '{UNICAST DATA (/PDSCH) (M number)+MULTICAST (/BRAODCAST) DATA (/PDSCH) (N number)}' and transmitted, and (B) if 'UNICAST DATA (/PDSCH)' is received, an (overall) payload is configured to have an ACK/NACK size according to the (/BRAODCAST) DATA (/PDSCH)'-related scheduling presence or absence (/number) information (on the 'U_DL GRANT') and transmitted.

Also, it may be configured such that, if scheduling presence or absence (/number) information related to 'MULTICAST (/BRAODCAST) DATA (/PDSCH)' is not signaled through 'UNICAST UL GRANT (U_UL GRANT)', an (overall) payload may be configured (A) to have an ACK/NACK size designated (/determined) by UL DAI for 'UNICAST DATA (/PDSCH)' and (B) to have a maximum ACK/NACK size for 'MULTICAST (/BRAODCAST) DATA (/PDSCH)', and piggybacked.

Also, it may be configured such that, in case where MULTICAST (/BRAODCAST) DATA (/PDSCH)'-related scheduling presence or absence (/number) information is signaled through 'UNICAST UL GRANT', an (overall) payload is configured (A) to have an ACK/NACK size designated (/determined) by a UL DAI for the 'UNICAST DATA (/PDSCH)' and (B) to have an ACK/NACK size (e.g., 'ZERO', 'NON-ZERO') according to 'MULTICAST (/BRAODCAST) DATA (/PDSCH)'-related scheduling presence or absence (/number) information (on the 'U_DL GRANT') for the 'MULTICAST (/BRAODCAST) DATA (/PDSCH)', and piggybacked.

A specific example in which the UE determines a payload size is as described above (e.g., as described above with reference to FIG. 14), and thus, for the purposes of description, a redundant description of the contents described above will be omitted.

Thereafter, the UE may transmit ACK/NACK information for the unicast data and ACK/NACK information for the multicast data based on the determined payload size (S1530). A specific example in which the UE transmits the ACK/NACK information for the unicast data and the ACK/NACK information for the multicast data is as described above, and thus, a redundant description thereof will be omitted.

2. Example in which the UE Sets Different Parameter (e.g., Alpha Offset or Beta Offset) Values Regarding ACK/NACK for Unicast Data and Multicast Data and Transmits ACK/NACK.

Figure 16:
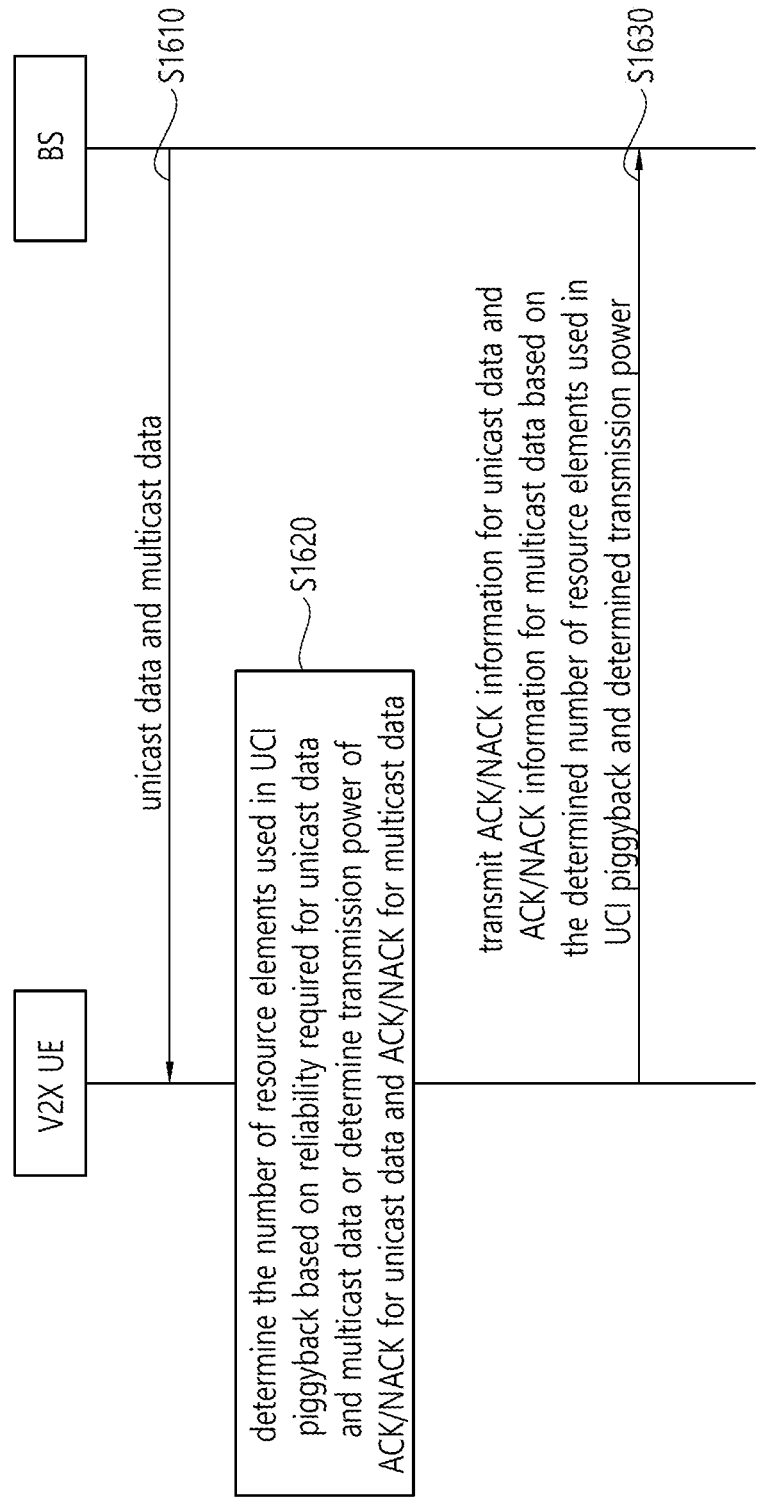
FIG. 16 is a flowchart illustrating a method of transmitting ACK/NACK for unicast data and multicast data by a V2X UE according to another embodiment of the present invention.

FIG. 16 is a flowchart illustrating a method of transmitting ACK/NACK for unicast data and multicast data by a V2X UE according to another embodiment of the present invention.

Referring to FIG. 16, a UE may receive unicast data and multicast data (S1610). Here, the UE may be a V2X UE, and a specific example in which the UE receives unicast data and multicast data is as described above.

Thereafter, the UE may determine (1) the number of resource elements used for uplink control information (UCI) piggyback or (2) transmission power of ACK/NACK for the unicast data and for the multicast data (S1620). For example, the V2X UE may transmit ACK/NACK for the unicast data and ACK/NACK for the multicast data on the basis of reliability required for the unicast data and the multicast data. Here, when transmitting ACK/NACK for the unicast data and ACK/NACK for the multicast data, the V2X UE may differently apply the number of resource elements used in UCI piggyback of ACK/NACK for data required to have relatively high reliability and the number of resource elements used in UCI piggyback for the data required to have relatively low reliability. Here, the number of resource elements used in UCI piggyback of ACK/NACK for data required to have relatively high reliability may be greater than the number of resource elements used in UCI piggyback of ACK/NACK for the data required to have relatively low reliability. Here, when the V2X UE transmits ACK/NACK for the unicast data and ACK/NACK for the multicast data, the V2X UE may differently apply transmission power of ACK/NACK transmission for data required to have relatively high reliability and transmission power of ACK/NACK transmission for data required to have relatively low reliability. Here, transmission power of ACK/NACK for the data required to have relatively high reliability may be higher than transmission power of ACK/NACK for the data required to have high reliability.

For example, (1) Here, determining the number of resource elements used in UCI (Uplink Control Information) piggyback based on reliability required for the unicast data and the multicast data by the UE may refer to differently setting (/signaling) 'MCS OFFSET (BETA_OFFSET) values' respectively applied to (used in) a case where ACK/NACK information including data (/control information) required to have relatively high reliability (e.g., 'M_ACK/NACK information' (or 'U_ACK/NACK information')) is 'PUSCH piggybacked' and in otherwise case. Here, as described above, the beta offset affects the number of REs (Resource Elements) for the UE to use in UCI (Uplink Control Information) piggyback. For example, if the beta offset is large, the number of REs used in UCI piggyback is increased, and if the beta offset is small, the number of REs used in UCI piggyback by the terminal is reduced. Here, if the beta offset is increased, a coding rate is lowered (because the REs used for data is reduced, while the number of REs used for UCI piggyback is increased) and reliability may be increased.

Here, determining transmission power of ACK/NACK for the unicast data and ACK/NACK for the multicast data based on reliability required for the unicast data and the multicast data by the UE may refer to that the UE differently (or independently) set (/signal) transmission power of related ACK/NACK information (parameter (e.g., P_O, alpha)) (e.g., the term of 'transmission power' may be interpreted as 'PUCCH (/PUSCH) TRANSMISSION POWER' in which (related) ACK/NACK information is transmitted (/piggybacked) according to 'traffic (/data/service) type' (and/or 'PUCCH (/PUSCH) TRANSMISSION POWER'.

A specific example in which the UE determines different offsets (e.g., alpha offset or beta offset) is as described above (e.g., as described above with reference to FIG. 14), and thus, for the purposes of description, a redundant description of the contents described above will be omitted.

Thereafter, the UE may transmit ACK/NACK information for the unicast data and ACK/NAC information for the multicast data based on (1) the determined number of resource elements used in the UCI piggyback or (2) the determined transmission power (S1630). A specific example in which the UE transmits the ACK/NACK information for the unicast data and ACK/NAC information for the multicast data is as described above, and thus, a redundant description thereof will be omitted.

3. An Example in which a Transmission Time of ACK/NACK Information Having a Low Priority is Shifted (or Dropped) on the Basis of Priority FIG. 17 is a flowchart illustrating a method of transmitting ACK/NACK for unicast data and multicast data by a V2X UE according to another embodiment of the present invention.

Figure 17:
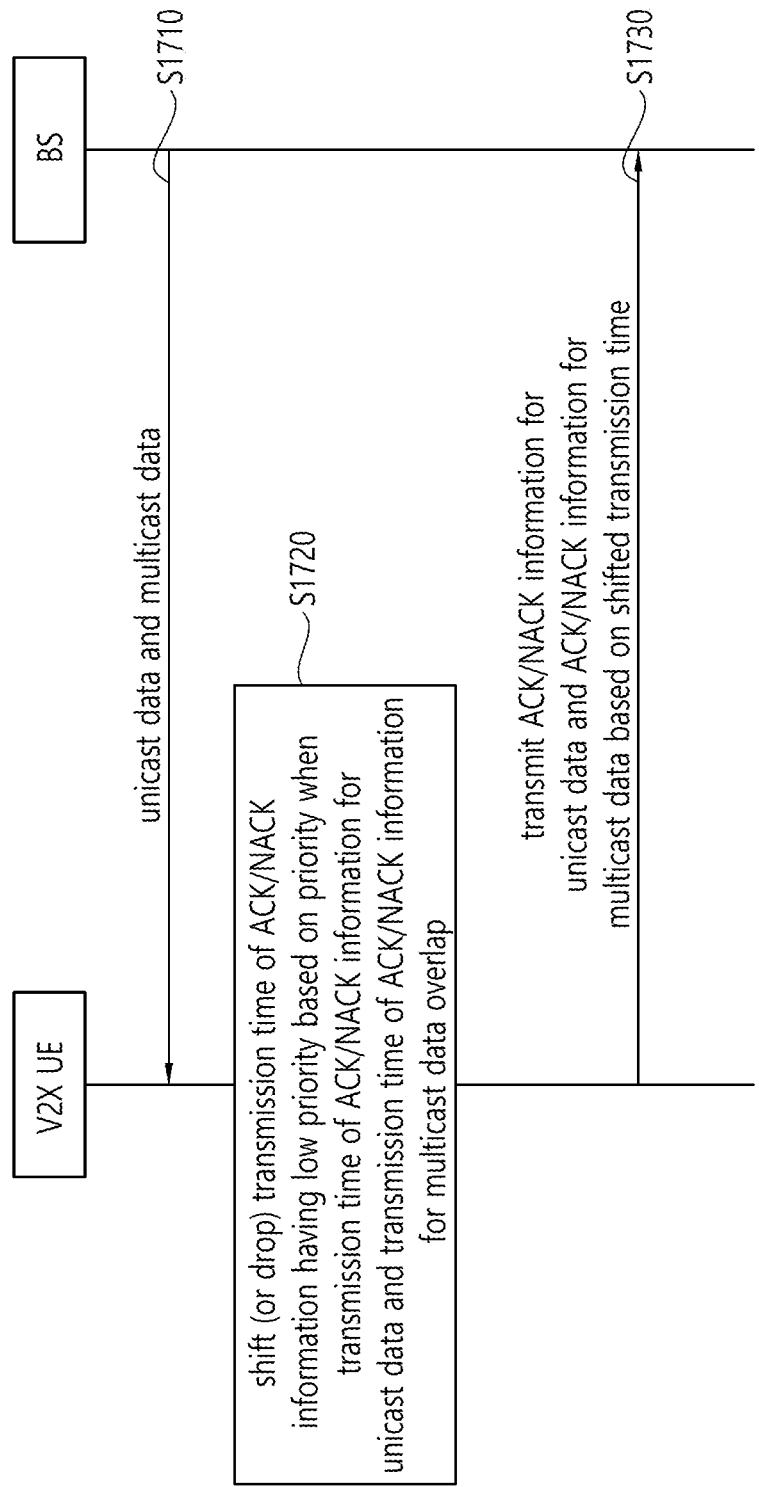
FIG. 17 is a flowchart illustrating a method of transmitting ACK/NACK for unicast data and multicast data by a V2X UE according to another embodiment of the present invention.

Referring to FIG. 17, a UE may receive unicast data and multicast data (S1710). Here, the UE may be a V2X UE, and a specific example in which the UE receives unicast data and multicast data is as described above.

If a transmission time of the ACK/NACK information for the unicast data and a transmission time of the ACK/NACK information for the multicast data overlap, the UE may shift (or drop) a transmission time of the ACK/NACK information having a lower priority based on priority (S1720). For example, in case where a transmission time of the ACK/NACK information for the unicast data and a transmission time of the ACK/NACK information for the multicast data overlap, the V2X UE may transmit ACK/NACK for the unicast data and ACK/NACK for the multicast data on the basis of priority. Here, the V2X UE may delay transmission of ACK/NACK for data having a relatively low priority. Here, the V2X UE may drop transmission of ACK/NACK for the data having a relatively low priority. Here, the V2X UE may transmit ACK/NACK for the data having the relatively low priority according to the type of a downlink subframe associated with an uplink subframe in which ACK/NACK for the data having the relatively low priority is transmitted. Here, the type of the downlink subframe may be determined by at least one of a system information block (SIB) time division duplex (TDD) uplink downlink setting, a downlink HARQ reference setting, and a downlink HARQ timeline. Here, in the FDD (Frequency Division Duplex) system, the V2X UE may transmit ACK/NACK for the data having a relatively low priority based on downlink HARQ reference setting.

That is, an example in which, when the transmission time of the ACK/NACK information for the unicast data and the transmission time of the ACK/NACK information for the multicast data overlap, the UE shifts (or drops) the transmission time of the ACK/NACK information having a lower priority based on priority is as described above (for example, FIG. 14). For example, in order to reduce a reduction in corresponding (data) performance, it may be configured such that, if a transmission time of 'ACK/NACK information' (L_ACK/NACK information) having a relatively low priority overlaps a transmission time of 'ACK/NACK information' (H_ACK/NACK information) having a (relatively) high priority (in the time domain), the transmission time of the 'ACK/NACK information' is shifted (according to predefined (/signaled) rule).

(1) As described above, from the viewpoint of setting SF_TYPE, shifting the transmission time of ACK/NACK information having a low priority based on priority may be described as follows.

As described above, (A) 'DL SFs' (/'SPECIAL SFs') which are the same 'DL SF' (/'SPECIAL SF') and (simultaneously) have the same 'DL HARQ TIMELINE' (or 'ACK/NACK TX TIMELINE') on 'SIB TDD UL-DL CONFIGURATION' and 'DL HARQ REFERENCE CONFIGURATION' may be termed a 'SF_TYPE #1'.

(B) DL SFs' (/'SPECIAL SFs') which are the same 'DL SF' (/'SPECIAL SF') and (simultaneously) have different 'DL HARQ TIMELINEs' (or 'ACK/NACK TX TIMELINEs') on the 'SIB TDD UL-DL CONFIGURATION' and 'DL HARQ REFERENCE CONFIGURATION' may be termed a 'SF_TYPE #2'.

(C) 'UL SF' and 'DL SF' respectively on the 'SIB TDD UL-DL CONFIGURATION' and 'DL HARQ REFERENCE CONFIGURATION' may be termed a 'SF_TYPE #3'.

As described above, since the SF_TYPE #1 is the same DL SF ('/SPECIAL SF') and (simultaneously) has the same 'DL HARQ TIMELINE' (or; 'ACK/NACK TX TIMELINE') on the 'SIB TDD UL-DL CONFIGURATION' and 'DL HARQ REFERENCE CONFIGURATION', a probability of using the SF_T_YPE #1 always may be high in terms of PUCCH resource. Thus, it may be preferred to preferentially reserve ACK/NACK information for SF_TYPE #1, and a specific example thereof is as described above.

For example, after 'PUCCH RESOURCE' related to 'SF_TYPE #1 L_ACK/NACK information' is preferentially 'STACKED (/RESERVED)', 'PUCCH RESOURCE' related to 'SF_TYPE #2 L_ACK/NACK information' may be stacked (/reserved). Hereinafter, for the purposes of description, a redundant description of the contents described above will be omitted.

In another example, after 'PUCCH RESOURCE' related to 'SF_TYPE #1 L_ACK/NACK information' is preferentially 'STACKED (/RESERVED), 'PUCCH RESOURCE' related to 'SF_TYPE #2/3 L_ACK/NACK information' is stacked (/reserved) (for example, 'SF_TYPE #2/3' may share common 'PUCCH RESOURCE REGION' and 'BLOCK INTERLEAVING' may be applied to 'SF_TYPE #2/3'). Hereinafter, for the purposes of description, a redundant description of the contents described above will be omitted.

(2) For example, in the existing FDD system, 'DL HARQ TIMELINE' (or 'ACK/NACK TX TIMELINE') may be SF # (P+4), for example. In addition, in the existing FDD system, a DAI (Downlink Assignment Index) is not separately set.

However, as described above, a method for performing 'L_ACK/NACK information configuration/transmission' may be proposed from a new perspective, rather than performing 'L_ACK/NACK information configuration/transmission' in SF # (P+4) as in the existing FDD system. Also, in the FDD system, a DAI may be separately set.

For example, in case where 'DL HARQ REFERENCE CONFIGURATION' is set (/signaled) in the FDD system, shifting a transmission time of ACK/NACK information having a low priority based on priority from a viewpoint that 'L_ACK/NACK information configuration/transmission' is performed according to (some of) the following rules may be described as follows.

For example, in order to avoid the 'L_DATA (/PDSCH)' scheduling restriction in the 'DL SF # P' corresponding to the 'UL SF # K' position on the 'DL HARQ reference configuration', L/ACK/NACK information related to 'L_DATA (/PDSCH)' received in the corresponding 'DL SF # P' may be set to exceptionally follow ('DL HARQ REFERENCE CONFIGURATION'-related 'DL HARQ TIMELINE' (or 'DL HARQ TIMELINE' (or 'ACK/NACK TX TIMELINE') (e.g., 'SF # (P+4)' of the existing FDD system (or rather than 'ACK/NACK TX TIMELINE')). Hereinafter, for the purposes of description, a redundant description of the contents described above will be omitted.

For example, it may be configured such that, in case where 'DL HARQ REFERENCE CONFIGURATION' is set (/signaled), a 'DL DAI field' is present on ('L_DATA (/PDSCH)' scheduling-related) 'DL GRANT' transmitted on USS (UE-SPECIFIC SEARCH SPACE) and 'DL DAI field' is not present on ('L_DATA (/PDSCH)' scheduling-related) 'DL GRANT' transmitted on CSS (unlike the case of the existing FDD system). Hereinafter, for the purposes of description, a redundant description of the contents described above will be omitted.

For example, in case where 'DL HARQ REFERENCE CONFIGURATION' is set (/signaled), an 'L_ACK/NACK BIT ORDERING' operation may be performed based on 'SF INDEX' (or '(DL) DAI') (ascending order (or descending order)) (or 'DL HARQ TIMELINE order' related to'DL HARQ REFERENCE CONFIGURATION' (or 'ACK/NACK TX TIMELINE order'). Hereinafter, for the purposes of description, a redundant description of the contents described above will be omitted.

Thereafter, the UE may transmit ACK/NACK information for the unicast data and ACK/NACK information for the multicast data based on the shifted transmission time (S1730).

Figure 18:
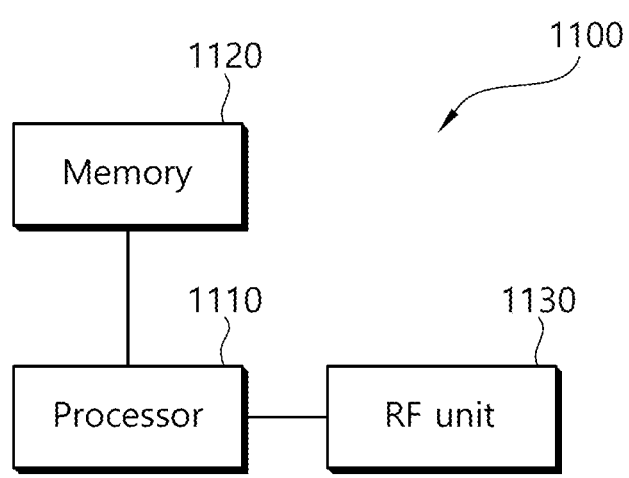
FIG. 18 is a block diagram illustrating a UE in which an embodiment of the present invention is implemented.

FIG. 18 is a block diagram illustrating a UE in which an embodiment of the present invention is implemented.

Referring to FIG. 18, a UE 1100 includes a processor 1110, a memory 1120, and a radio frequency (RF) unit 1130.

According to an embodiment, the processor 1110 may implement the functions/operations/methods described in the present invention. For example, the processor 1110 may receive unicast data and multicast data from a BS. Here, the processor 1110 may transmit an acknowledgment (ACK)/negative acknowledgment (NACK) for the unicast data and ACK/NACK for the multicast data to the BS, and the unicast data may be data for the V2X UE and the multicast data may be data for a plurality of V2X UEs including the V2X UE.

The RF unit 1130 is connected to the processor 1110 to transmit and receive a radio signal.

The processor may include an application-specific integrated circuit (ASIC), other chipset, a logic circuit, and/or a data processing device. The memory may include a read-only memory (ROM), a random access memory (RAM), a flash memory, a memory card, a storage medium, and/or other storage devices. The RF unit may include a baseband circuit for processing a radio signal. When the embodiment is implemented in software, the above-described techniques may be implemented with a module (process, function, etc.) that performs the functions described above. The module may be stored in the memory and may be executed by the processor. The memory may be present inside or outside the processor and may be coupled to the processor by a well known means.

What is claimed is:

1. A method for performing vehicle-to-X (V2X) operation in a wireless communication system, the method performed by a V2X terminal comprising:
   receiving, from a base station, unicast data and multicast data; and
   transmitting, to the base station, an acknowledgement (ACK)/negative acknowledgement (NACK) for the unicast data and ACK/NACK for the multicast data,
   wherein the unicast data is data for the V2X terminal and the multicast data is data for a plurality of V2X terminals including the V2X terminal, and
   wherein the V2X terminal transmits ACK/NACK for the unicast data and ACK/NACK for the multicast data according to a payload size determined based on whether only the unicast data is received or whether the unicast data and the multicast data are simultaneously received.

2. The method of claim 1, wherein
   the V2X terminal transmits ACK/NACK for the unicast data and ACK/NACK for the multicast data according to a payload size determined based on whether the V2X terminal receives scheduling information regarding the multicast data.

3. The method of claim 1, wherein
   the V2X terminal transmits ACK/NACK for the unicast data and ACK/NACK for the multicast data based on reliability required for the unicast data and the multicast data.

4. The method of claim 3, wherein
   based on the V2X terminal transmitting ACK/NACK for the unicast data and ACK/NACK for the multicast data, the V2X terminal differently applies the number of resource elements used in uplink control information (UCI) piggyback of ACK/NACK for data required to have relatively high reliability and the number of resource elements used in UCI piggyback of ACK/NACK for data required to have relatively low reliability.

5. The method of claim 4, wherein
   the number of resource elements used in UCI piggyback of ACK/NACK for the data required to have relatively high reliability is greater than the number of resource elements used in UCI piggyback of ACK/NACK for the data required to have relatively low reliability.

6. The method of claim 3, wherein
   based on the V2X terminal transmitting ACK/NACK for the unicast data and ACK/NACK for the multicast data, the V2X terminal differently applies transmission power of ACK/NACK transmission for the data required to have relatively high reliability and transmission power of ACK/NACK transmission for the data required to have relatively low reliability.

7. The method of claim 6, wherein
   the transmission power of ACK/NACK transmission for the data required to have relatively high reliability is higher than the transmission power of ACK/NACK transmission for the data required to have relatively low reliability.

8. The method of claim 1, wherein
   based on a transmission time of ACK/NACK for the unicast data and a transmission time of ACK/NACK for the multicast data overlap, ACK/NACK for the unicast data and ACK/NACK for the multicast data are transmitted based on priority.

9. The method of claim 8 wherein
   the V2X terminal delays transmission of ACK/NACK for data having relatively low priority.

10. The method of claim 8, wherein
the V2X terminal drops transmission of ACK/NACK for data having relatively low priority.

11. The method of claim 8, wherein
the V2X terminal transmits ACK/NACK for the data having relatively low priority according to a type of a downlink subframe associated with an uplink subframe in which transmission of ACK/NACK for the data having relatively low priority is performed.

12. The method of claim 11, wherein
the type of the downlink subframe is determined by at least one of a system information block (SIB) time division duplex (TDD) uplink downlink setting, a downlink hybrid automatic repeat and request (HARQ) reference setting, and a downlink HARQ time line.

13. The method of claim 8, wherein
the V2X terminal transmits ACK/NACK for data having relatively low priority based on a downlink HARQ reference setting in a frequency division duplex (FDD) system.

14. A Vehicle-to-X (V2X) user equipment (UE) comprising:
a transceiver configured to transmit and receive a radio signal; and
a processor coupled to the transceiver and configured to:
receive, from a base station, unicast data and multicast data; and
transmit, to the base station, an acknowledgement (ACK)/negative acknowledgement (NACK) for the unicast data and ACK/NACK for the multicast data,
wherein the unicast data is data for the V2X UE and the multicast data is data for a plurality of V2X UEs including the V2X UE, and
wherein the V2X UE transmits ACK/NACK for the unicast data and ACK/NACK for the multicast data according to a payload size determined based on whether only the unicast data is received or whether the unicast data and the multicast data are simultaneously received.

\* \* \* \* \*